United States Patent
Sakamoto

(10) Patent No.: US 8,169,533 B2
(45) Date of Patent: May 1, 2012

(54) ZOOM LENS SYSTEM AND IMAGE PICKUP APPARATUS INCLUDING THE SAME

(75) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 125 days.

(21) Appl. No.: 12/697,564

(22) Filed: Feb. 1, 2010

(65) Prior Publication Data
US 2010/0194969 A1    Aug. 5, 2010

(30) Foreign Application Priority Data
Jan. 30, 2009    (JP) ................ 2009-020226

(51) Int. Cl.
G03B 13/00    (2006.01)
H04N 5/232    (2006.01)
G02B 15/14    (2006.01)

(52) U.S. Cl. ......... 348/345; 359/687; 359/688; 359/689

(58) Field of Classification Search .. 348/240.99–240.3, 348/335–369; 359/683–687, 715, 726, 740, 359/774
See application file for complete search history.

(56) References Cited

U.S. PATENT DOCUMENTS

| | | | | |
|---|---|---|---|---|
| 4,451,124 A | * | 5/1984 | Basista et al. | 359/687 |
| 4,701,034 A | * | 10/1987 | Mihara | 359/688 |
| 5,831,771 A | * | 11/1998 | Suzuki | 359/689 |
| 6,545,818 B2 | * | 4/2003 | Usui et al. | 359/686 |
| 7,764,438 B2 | * | 7/2010 | Kamo et al. | 359/687 |
| 8,049,968 B2 | * | 11/2011 | Yamanaka et al. | 359/676 |
| 2006/0221460 A1 | * | 10/2006 | Saruwatari | 359/676 |

FOREIGN PATENT DOCUMENTS

| | | |
|---|---|---|
| JP | 63-237020 A | 10/1988 |
| JP | 2000-089109 A | 3/2000 |

* cited by examiner

*Primary Examiner* — Jason Chan
*Assistant Examiner* — Pritham Prabhakher
(74) *Attorney, Agent, or Firm* — Rossi, Kimms & McDowell LLP

(57) ABSTRACT

A zoom lens system having a high zoom ratio and excellently correcting various aberrations over an entire zoom range between a wide angle end and a telephoto end to obtain high optical performance in the entire zoom range, includes, in order from an object side to an image side, a first lens unit having a positive refractive power, a second lens unit having a negative refractive power, a third lens unit, and a fourth lens unit. The fourth lens unit includes a front subunit and a rear subunit, the rear subunit being constituted by two negative lenses and at least three positive lenses. The rear subunit includes a first rear-subunit and a second rear-subunit. Each of the first rear-subunit and the second rear-subunit includes a negative lens and at least one positive lens. Lens materials are suitably set for the first rear-subunit and the rear second-subunit.

12 Claims, 25 Drawing Sheets

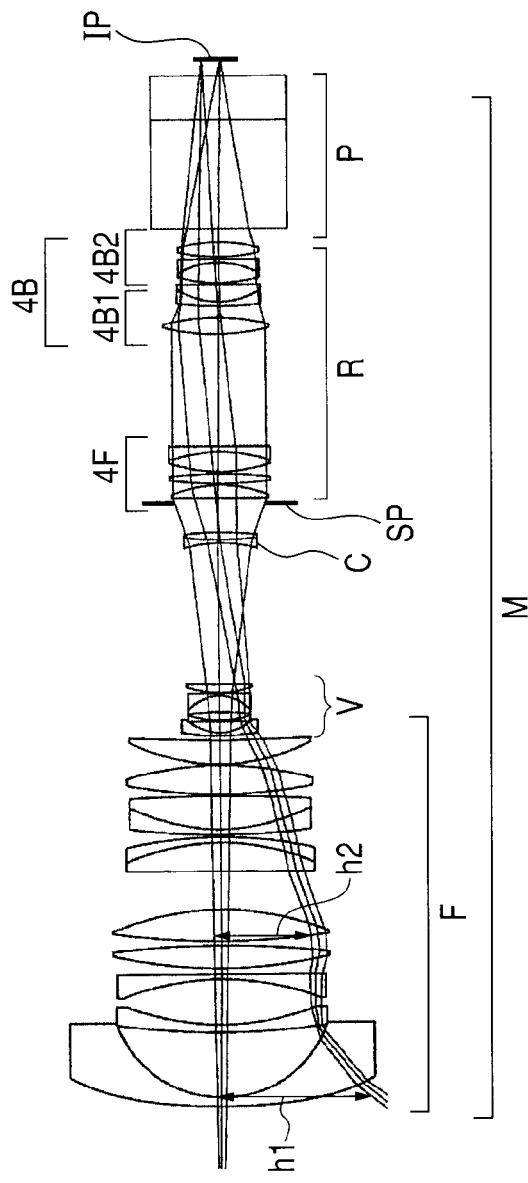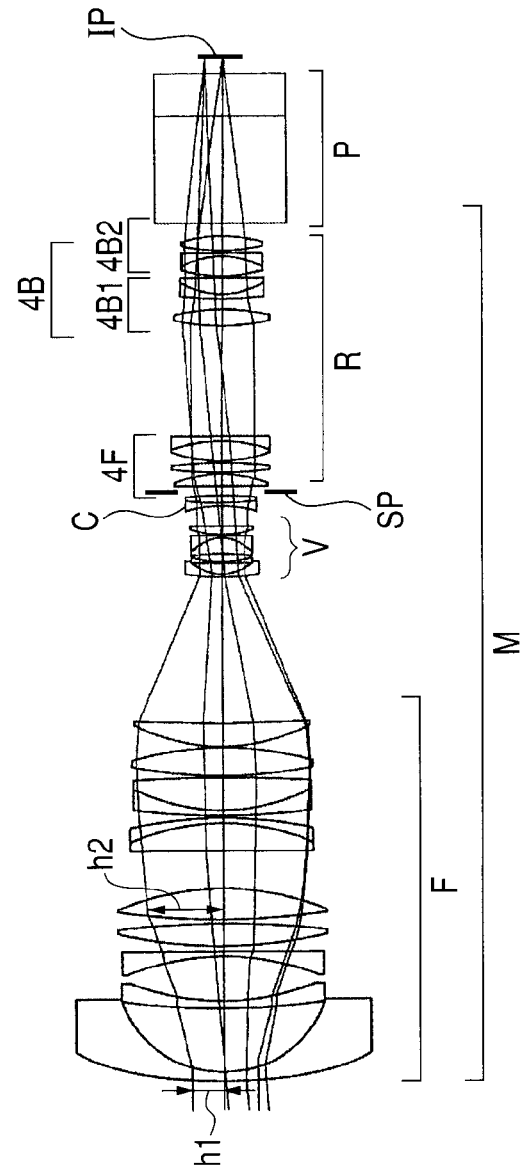

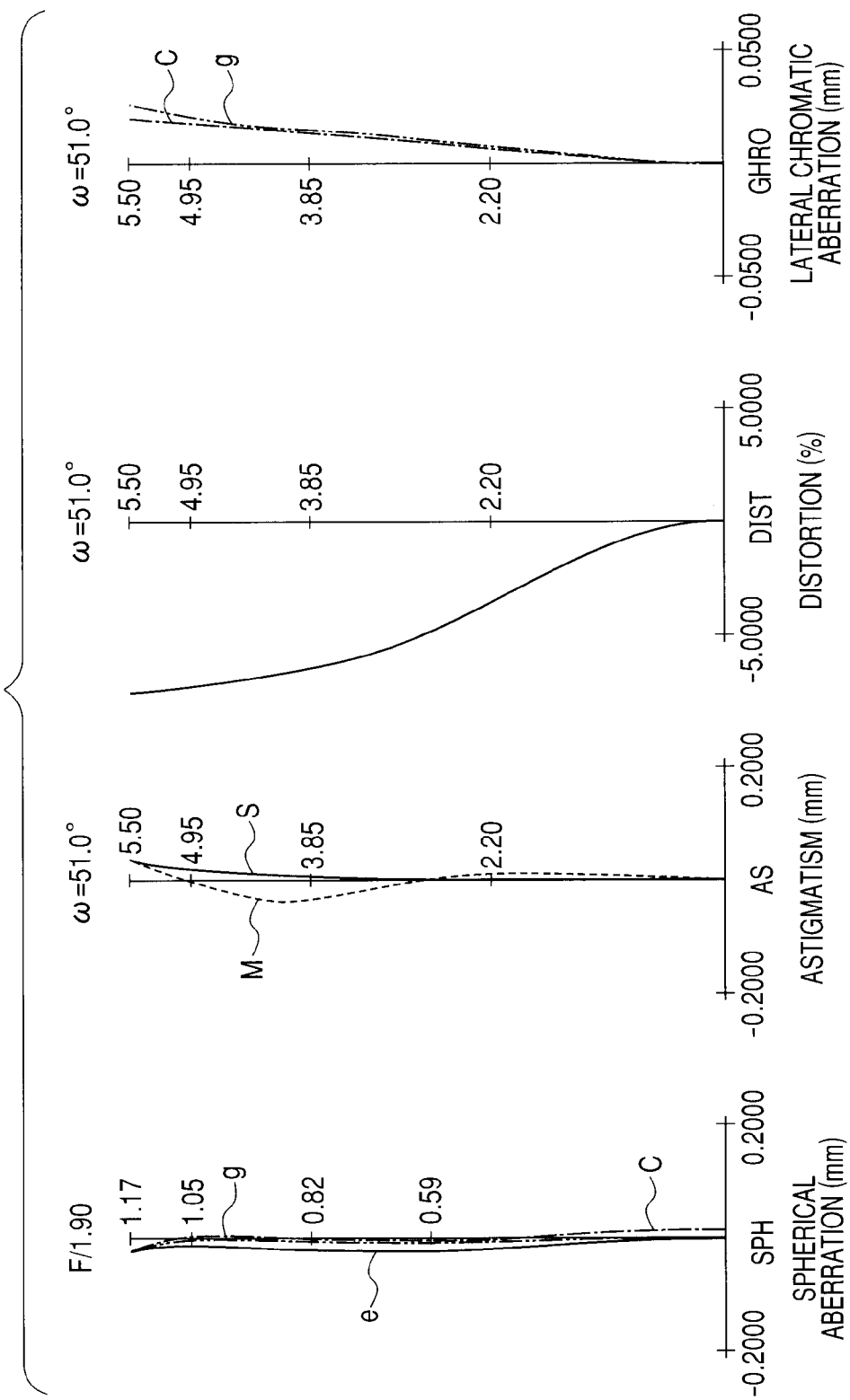

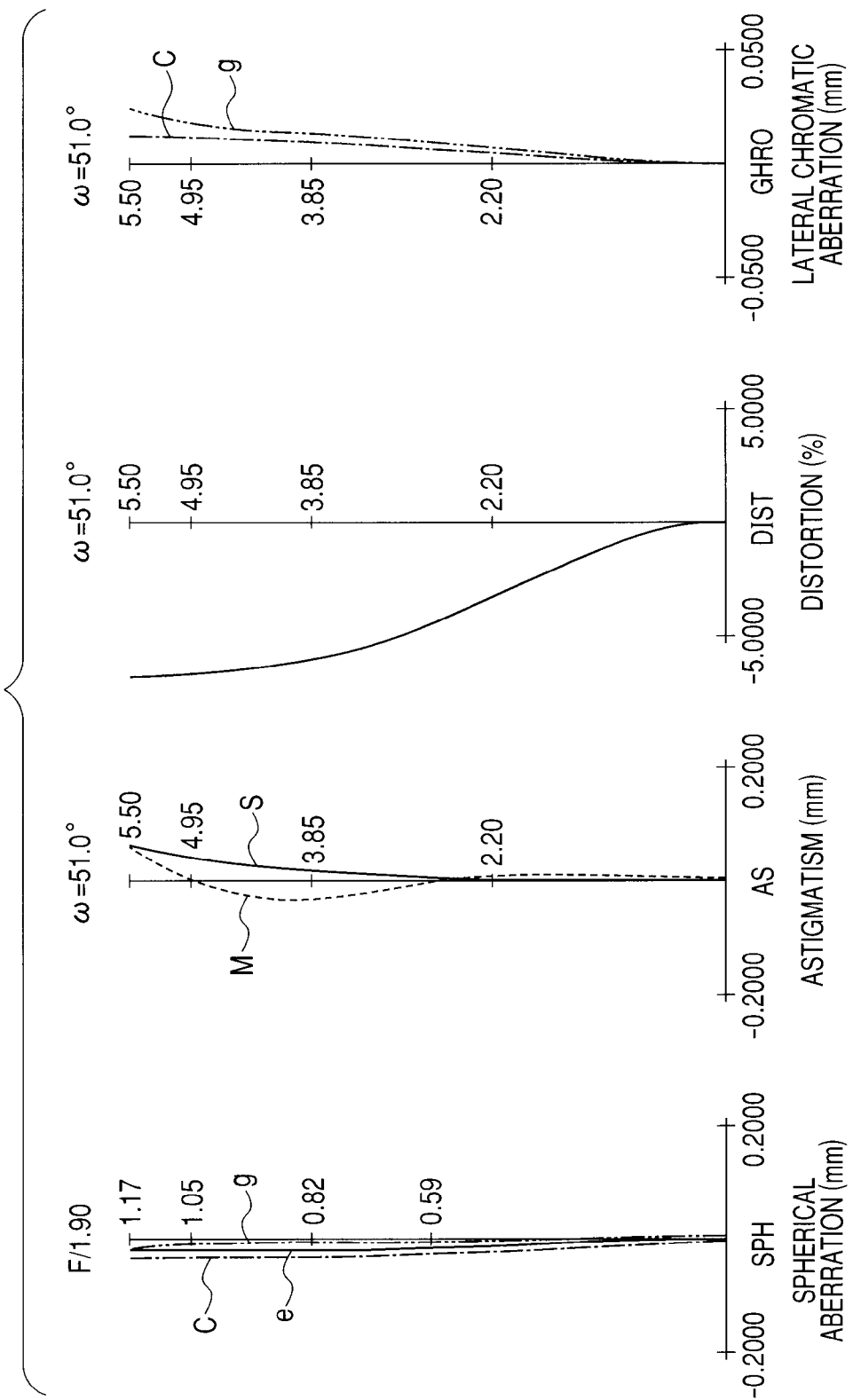

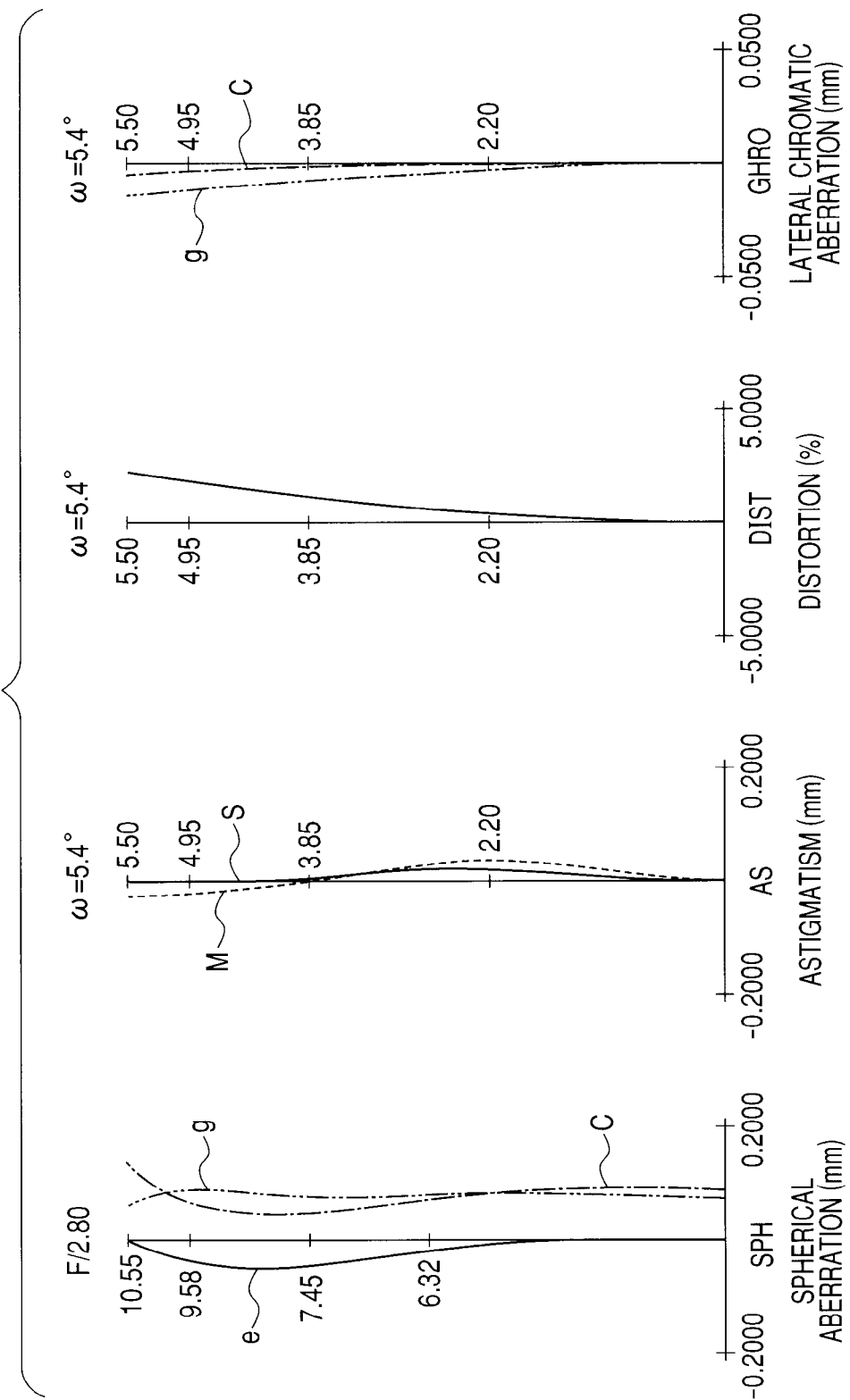

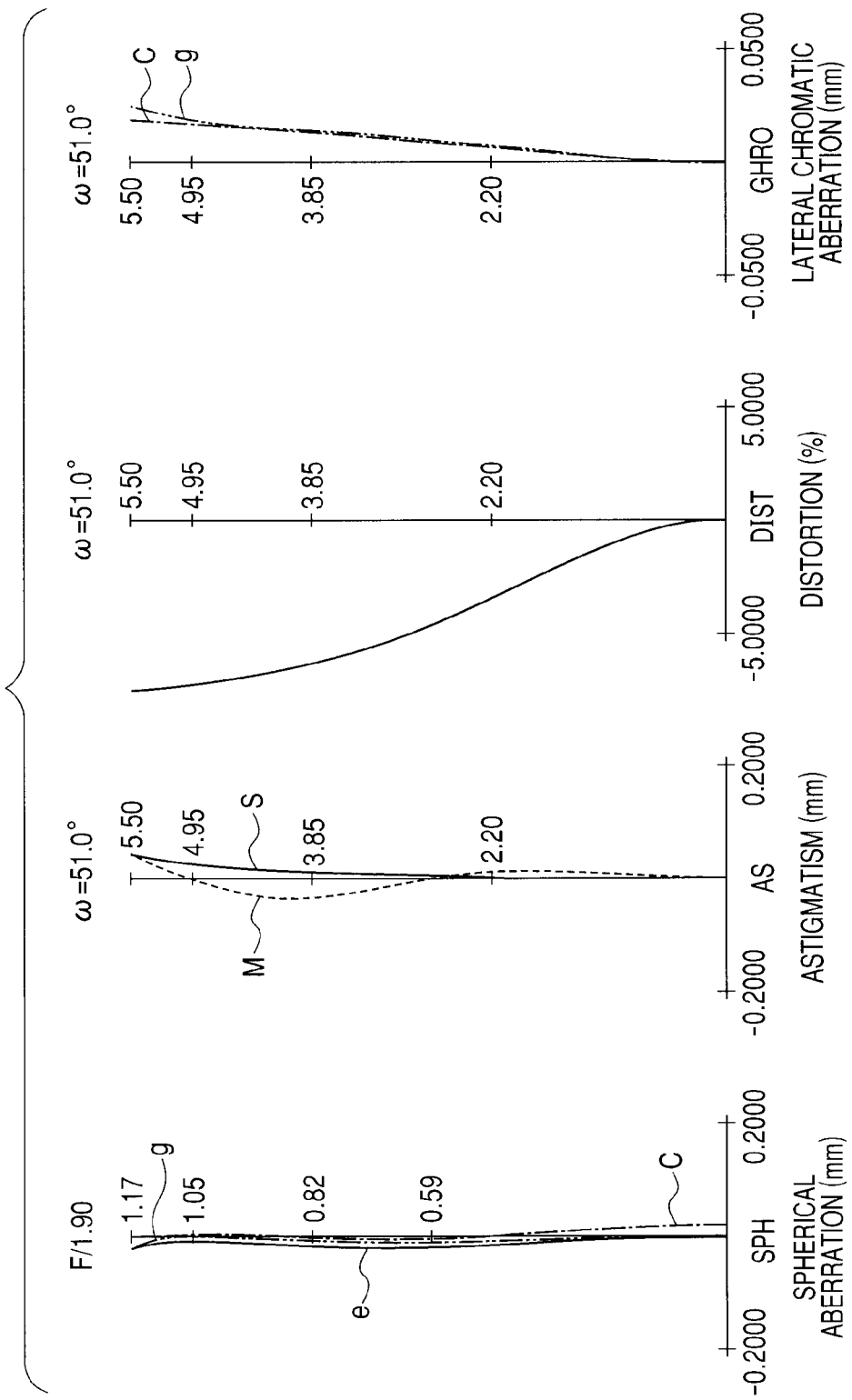

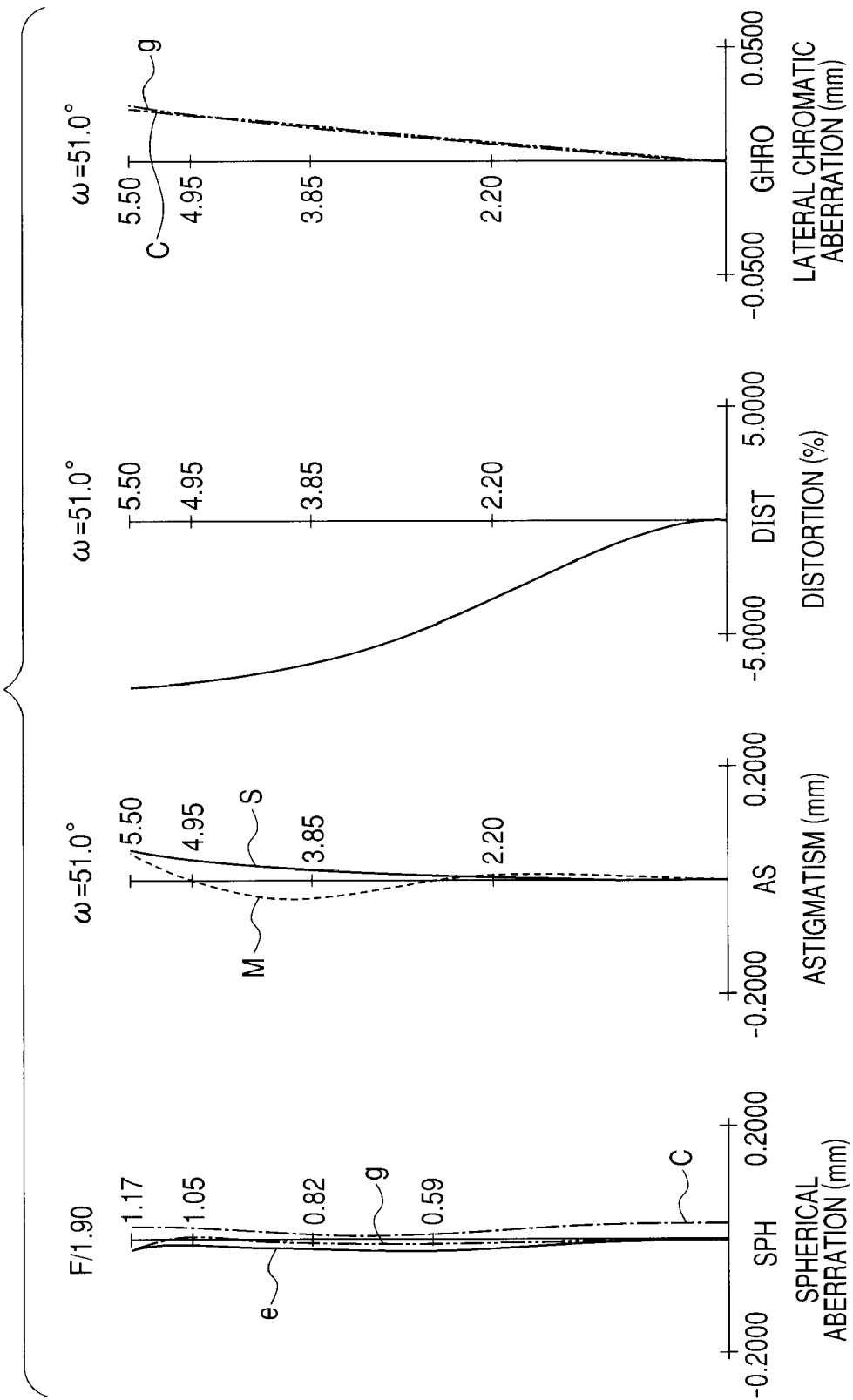

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same, which are suitable for use in a television camera for broadcasting, a video camera, a digital still camera, and a silver-halide film camera.

2. Description of the Related Art

In recent years, there has been a demand for a zoom lens system having a large aperture ratio, a high zoom ratio, a wide field angle, and high optical performance for image pickup apparatuses such as a television camera, a silver-halide film camera, a digital camera, and a video camera. Of the image pickup apparatuses, it has been demanded that an image pickup apparatus for a broadcast color television camera have a zoom lens system having a long back focus because a color separation optical system or various filters are provided in front of (on object side of) an image pickup unit. A positive lead type four-unit zoom lens system has been known as a zoom lens system satisfying the demand.

The four-unit zoom lens system includes, in order from the object side to an image side, a first lens unit having a positive refractive power, a second lens unit having a negative refractive power, a third lens unit having a positive refractive power, and a fourth lens unit having a positive refractive power. The first lens unit includes a focusing lens unit. The second lens unit is used for magnification-varying. The third lens unit moves during magnification-varying.

In the case of the four-unit zoom lens system described above, in order to obtain a large aperture ratio, a high magnification-varying ratio, a shooting field angle 2ω at a wide angle end which is equal to or larger than 78°, and high optical performance over the entire magnification-varying range, it is necessary to suitably set the refractive powers of the respective lens units and the lens structures.

For example, when the lens structure of the fourth lens unit for imaging is not suitably set, it is difficult to reduce variations in chromatic aberration, spherical aberration, halo, coma, and chromatic difference in spherical aberration and achieve a high zoom ratio and high performance while maintaining a predetermined back focus.

In particular, when a lens unit (extender lens) for changing a focal length range of the entire system is provided so as to be removably inserted between the lens subunit located on the object side and the lens subunit located on the image side onto the optical path in the fourth lens unit, it is important to suitably set the lens structure of the lens subunit located on the image side in the fourth lens unit.

SUMMARY OF THE INVENTION

An object of the present invention is to provide a zoom lens system of which a zoom ratio is high and various aberrations are excellently corrected over an entire zoom range between a wide angle end and a telephoto end to obtain high optical performance in the entire zoom range, and an image pickup apparatus including the zoom lens system.

Therefore, a zoom lens system according to the present invention includes, in order from an object side to an image side: a first lens unit which does not move for zooming and has a positive refractive power; a second lens unit which moves toward the image side during zooming from a wide angle end to a telephoto end and has a negative refractive power; a third lens unit which moves during zooming; and a fourth lens unit which does not move for zooming, in which: the fourth lens unit includes a front subunit and a rear subunit which are provided in order from the object side to the image side; the front subunit and the rear subunit are opposed to each other with an air interval sandwiched therebetween, the air interval being maximum among air intervals of the fourth lens unit; the rear subunit 4B includes two negative lenses and at least three positive lenses; the rear subunit 4B includes a first rear-subunit 4B1 and a second rear-subunit 4B2; a center position in a thickness direction of at least one lens included in the first rear-subunit 4B1 is located in the object side of a center position of a total-length of the rear subunit 4B in the optical axis direction, and a center position in a thickness direction of at least one lens included in the second rear-subunit 4B2 is located in the image side of the center position of the total-length of the rear subunit 4B in the optical axis direction; each of the first rear-subunit 4B1 and the second rear-subunit 4B2 includes a negative lens and a positive lens; and the following conditions are satisfied:

$$0.50 < \nu 1p/\nu 1n < 1.10; \text{ and}$$

$$2.30 < \nu 2p/\nu 2n,$$

where ν1p and ν2p indicate an average Abbe number of materials of the positive lens of the first rear-subunit 4B1 and an average Abbe number of materials of the positive lens of the second rear-subunit 4B2, respectively, and νin and ν2n indicate an Abbe number of a material of the negative lens of the first rear-subunit 4B1 and an Abbe number of a material of the negative lens of the second rear-subunit 4B2, respectively.

Further features of the present invention become apparent from the following description of exemplary embodiments with reference to the attached drawings.

BRIEF DESCRIPTION OF THE DRAWINGS

FIG. 1 is a lens cross-sectional view illustrating Embodiment 1 of the present invention at a wide angle end.

FIG. 2 is a lens cross-sectional view illustrating Embodiment 1 of the present invention at a telephoto end.

FIGS. 3A and 3B are aberration graphs in Embodiment 1 of the present invention at the wide angle end and at the telephoto end, respectively.

FIGS. 11A and 11B are aberration graphs in Embodiment 4 of the present invention at the wide angle end and at the telephoto end, respectively.

FIGS. 13A and 13B are aberration graphs in Embodiment 5 of the present invention at the wide angle end and at the telephoto end, respectively.

FIGS. 17A and 17B are aberration graphs in Embodiment 7 of the present invention at the wide angle end and at the telephoto end, respectively.

DESCRIPTION OF THE EMBODIMENTS

Hereinafter, a zoom lens system according to embodiments of the present invention and an image pickup apparatus including the zoom lens system are described in detail with reference to the attached drawings.

Figure 17B:
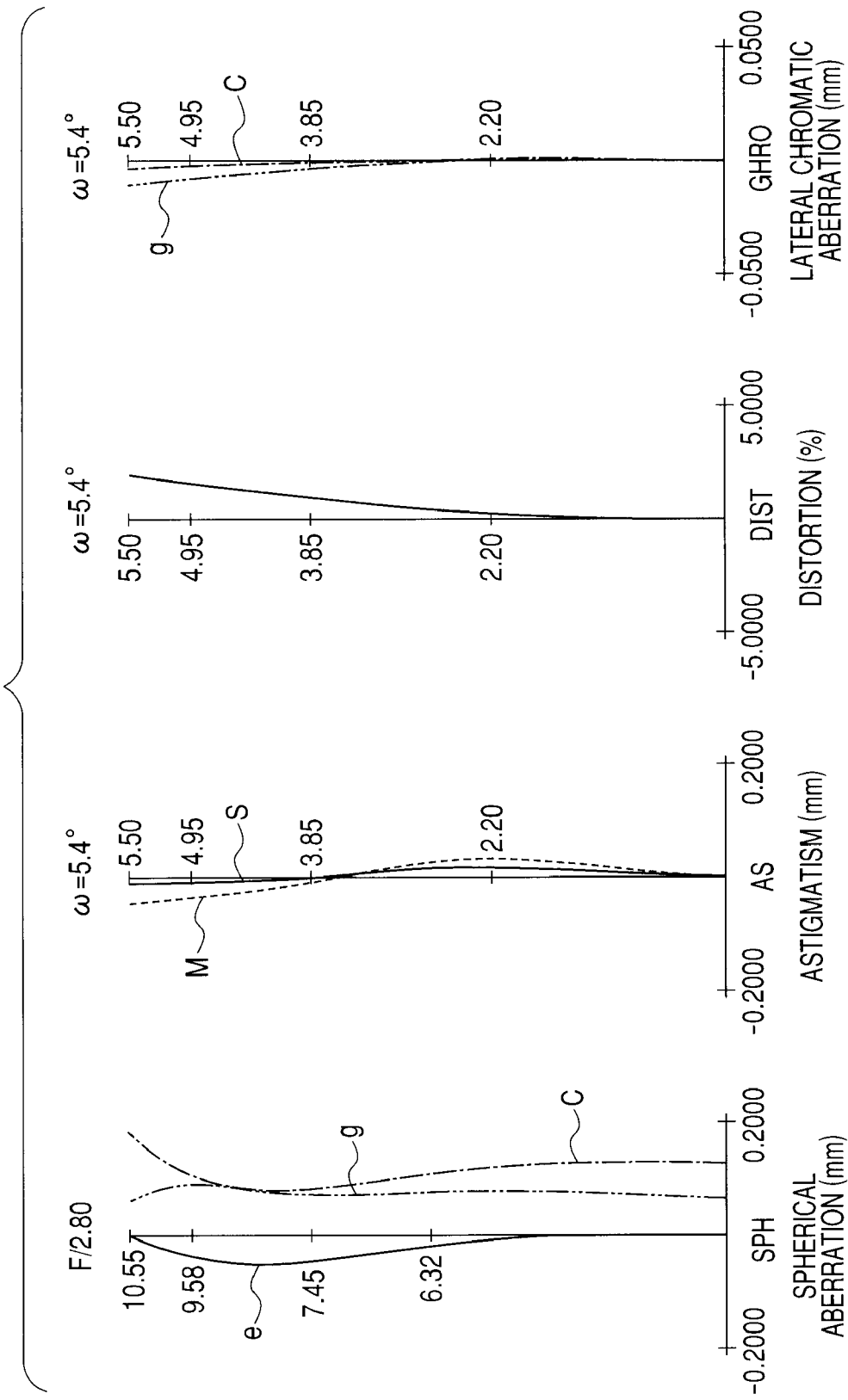
Figure 18:
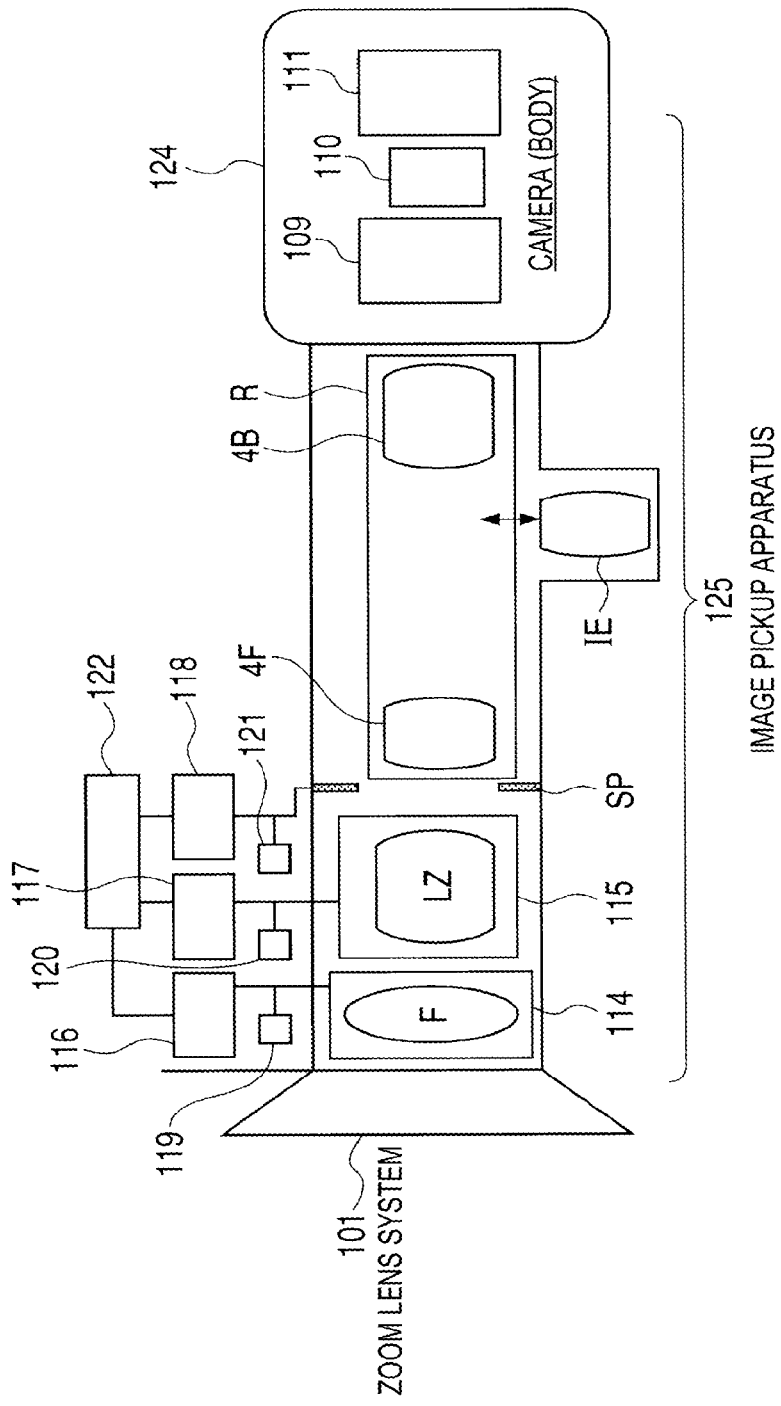
FIG. 18 is a principal schematic diagram illustrating an image pickup apparatus according to the present invention.

FIGS. 1 to 17 are lens cross-sectional views illustrating the zoom lens system according to Embodiments 1 to 7 and aberration graphs at a wide angle end (wide end) and a telephoto end (tele-end). FIG. 18 is a principal schematic diagram illustrating an example of an image pickup apparatus according to the present invention.

The zoom lens system according to the present invention includes, in order from an object side (magnifying side, magnifying conjugate side, or front) to an image side (reduction side, reduction conjugate side, or rear), a first lens unit F having a positive refractive power, a second lens unit V having a negative refractive power, a third lens unit C having a positive or negative refractive power, and a fourth lens unit R. The first lens unit F includes a focusing lens unit and does not move for zooming (magnification-varying). The second lens unit is used for magnification-varying and monotonously moves toward the image side during zooming from the wide angle end (short-focal length end) to the telephoto end (long-focal length end). At least a part of the third lens unit moves (along nonlinear locus) to reduce (correct) an image plane variation due to magnification-varying. The fourth lens unit is held during zooming.

The fourth lens unit includes a front subunit 4F and a rear subunit 4B which are provided at a maximum air interval therebetween among air intervals of the lens unit. The front subunit 4F is located on the object side. The rear subunit 4B is located on the image side. In other words, the front subunit 4F and the rear subunit 4B are opposed to each other at the maximum air interval therebetween in the fourth lens unit. The front sub unit 4F is located on the object side of the maximum air interval described above. The rear subunit 4B is located on the image side of the maximum air interval described above.

A lens unit (extender lens) which may be removably inserted onto an optical path to change a focal length range of the entire system is provided between the front subunit 4F and the rear subunit 4B in the fourth lens unit.

In the lens cross-sectional views, the first lens unit which does not move for zooming and has the positive refractive power is represented by reference symbol F.

The entire first lens unit F or a part thereof is moved for focusing. The first lens unit F does not move for zooming (magnification-varying).

The second lens unit (variator lens unit) which is movable during zooming and has the negative refractive power is represented by reference symbol V.

The second lens unit V is monotonously moved toward an image plane side on an optical axis for magnification-varying from the wide angle end to the telephoto end.

The third lens unit (compensator lens unit) which is movable during zooming to correct a variation in image plane position due to magnification-varying and has the positive or negative refractive power is represented by reference symbol C.

During magnification-varying from the wide angle end to the telephoto end, at least a part of the third lens unit C moves (along nonlinear locus) to reduce (correct) an image plane variation due to the magnification-varying. The second lens unit V and the third lens unit C serve as a magnification-varying system (magnification-varying section).

An aperture stop SP is provided on the image side of the third lens unit C. The fourth lens unit (relay lens unit) R is provided for imaging.

The fourth lens unit R includes a front lens subunit (front subunit) 4F and a rear lens subunit (rear subunit) 4B which are provided at the maximum air interval therebetween among the air intervals in the fourth lens unit R. The front lens subunit 4F is located on the object side. The rear lens subunit 4B is located on the image side. A lens unit (extender lens) IE for changing the focal length range of the entire system is removably inserted between the front subunit 4F and the rear subunit 4B (onto optical path). The rear subunit 4B includes a rear lens first-subunit (first rear-subunit) 4B1 located on the object side and a rear lens second-subunit (second rear-subunit) 4B2 located on the image side.

The first rear-subunit 4B1 corresponds to a lens unit constituted by lenses each having a center position in a lens thickness direction where the center position is located in the object side of a center position (on optical axis) of a total-length of the rear subunit 4B (total-rear subunit length direction) in the optical axis direction. The second rear-subunit 4B2 corresponds to a lens unit constituted by lenses each having a center position in the lens thickness direction where the center position is located in the image side of the center position of the total-length of the rear subunit 4B in the optical axis direction. In other words, a center position in the thickness direction of at least one lens which is included in the first rear-subunit 4B1 is located in the object side of the center position of the total-length of the rear subunit 4B in the optical axis direction, and a center position in the thickness direction of at least one lens which is included in the second rear-subunit 4B2 is located in the image side of the center position of the total-length of the rear subunit in the optical axis direction.

A color separation prism or optical filter P is indicated as a glass block. An image plane IP corresponds to an image pickup surface of a solid-state image pickup element (photoelectric transducer).

In FIG. 1, $\bar{h}_1, \bar{h}_2$ indicate incident heights of off-axial principal rays incident on a negative lens and a positive lens which are located on the object side in the first lens unit F at the wide angle end in Embodiment 1, respectively.

In FIG. 2, h1 and h2 indicate incident heights of axial marginal rays incident on the negative lens and the positive lens which are located on the object side in the first lens unit F at the telephoto end in Embodiment 1, respectively.

In the aberration diagrams, spherical aberrations relate to a g-line, an e-line, and a C-line. A meridional image plane and a sagittal image plane are indicated by M and S, respectively. Lateral chromatic aberrations relate to the g-line and the C-line. An F-number is indicated by F and a half field angle is indicated by ω.

In the following respective embodiments, the wide angle end corresponds to a zoom position in cases where the second lens unit V for varying magnification is located at one end of a range in which the second lens unit V is movable on the optical axis in view of mechanisms. The telephoto end corresponds to a zoom position in cases where the second lens unit V is located at the other end of the range.

Next, features of the respective embodiments are described.

In general, when the field angle at the wide angle end (shooting field angle) is equal to or larger than 78° in the four-unit zoom lens system of the type according to each of the embodiments, an effective diameter of the first lens unit becomes larger, and hence the first lens unit is increased in size. In this case, in order to reduce the size of the first lens unit, it is necessary to shorten a focal length of the first lens unit.

In order to shorten a principal point interval between the first lens unit and the second lens unit at the wide angle end, it is necessary to lengthen a back focus of the first lens unit.

Therefore, as illustrated in FIG. 1, a retrofocus type in which a lens unit having a negative refractive power is provided on the object side and a lens unit having a positive refractive power is provided on the image side is effective to reduce the size of the first lens unit.

In order to achieve a wide field angle, it is necessary to further lengthen the back focus of the first lens unit. When the back focus becomes longer, a retro ratio of the first lens unit increases, and a refractive power of the negative lens located on the object side in the first lens unit becomes stronger.

When the refractive power of the negative lens located on the object side in the first lens unit becomes stronger, the following tendency of the incident heights h1 and h2 of the axial marginal rays in FIG. 2 becomes significant.

h1<h2

In general, when the incident height tendency of h1<h2 becomes significant, a refractive power of the positive lens located on the object side becomes weaker because of a correction condition for excellently correcting the axial chromatic aberration.

As illustrated in FIG. 1, the incident heights $\bar{h}_1, \bar{h}_2$ of the off-axial principal rays incident on the negative lens and the positive lens which are located on the object side in the first lens unit are large at the wide angle end.

Therefore, as the refractive power of the negative lens becomes larger and the refractive power of the positive lens becomes weaker, the lateral chromatic aberration is insufficiently corrected at the wide angle end, and hence it is difficult to excellently correct the chromatic aberration.

The undercorrection of the lateral chromatic aberration means that an image height of light having a wavelength shorter than a reference wavelength is smaller than an image height of light having the reference wavelength.

The overcorrection of the lateral chromatic aberration means that the image height of the light having the wavelength shorter than the reference wavelength is larger than the image height of the light having the reference wavelength.

The undercorrection of the axial chromatic aberration means that an imaging position of the light having the wavelength shorter than the reference wavelength is closer to the object side than an imaging position of the light having the reference wavelength. The overcorrection of the axial chromatic aberration means that the imaging position of the light having the wavelength shorter than the reference wavelength is closer to the image side than the imaging position of the light having the reference wavelength.

In the respective embodiments, chromatic aberrations generated in the case where the first lens unit F has the retrofocus lens structure are reduced by suitably setting the lens structure of the rear lens subunit 4B of the fourth lens unit R.

In the respective embodiments, the rear subunit 4B includes two negative lenses and at least three positive lenses. In other words, lenses (optical elements having optical powers) serving as the rear subunit 4B correspond to the two negative lenses and the at least three positive lenses, and hence a stop and an optical filter which have no optical power may be included in the rear subunit 4B.

Each of the first rear-subunit 4B1 and the second rear-subunit 4B2 includes a negative lens and at least one positive lens.

Assume that ν1p indicates an average Abbe number of materials of positive lenses included in the first rear-subunit 4B1 and ν2p indicates an average Abbe number of materials of positive lenses of the second rear-subunit 4B2, respectively. When each of the units includes a single positive lens, an Abbe number of a material of the single positive lens is used.

Assume that ν1n indicates an Abbe number of a material of the negative lens of the first rear-subunit 4B1 and ν2n indicates an Abbe number of a material of the negative lens of the second rear-subunit 4B2, respectively. In this case, the following conditions are satisfied.

$$0.50 < \nu 1p/\nu 1n < 1.10 \quad (1)$$

$$2.30 < \nu 2p/\nu 2n \quad (2)$$

When Conditional Expressions (1) and (2) are satisfied, the lateral chromatic aberration at the wide angle end is excellently corrected to realize a zoom lens system having high optical performance.

Conditional Expressions (1) and (2) define the dispersions of the materials of the positive lens and the negative lens in the first rear-subunit 4B1 and the second rear-subunit 4B2.

In each of the first rear-subunit 4B1 located on the object side and the second rear-subunit 4B2 located on the image side, there is a difference between an incident height h of an axial marginal ray and an incident height $\bar{h}$ of an off-axial principal ray.

When the difference is used to suitably set an Abbe number ratio between the material of the positive lens and the material of the negative lens in each of the first rear-subunit 4B1 and the second rear-subunit 4B2, the lateral chromatic aberration at the wide angle end is excellently corrected without losing performance balance of the axial chromatic aberration.

When the condition of Conditional Expression (1) falls below the lower limit thereof, the dispersion of the material of the positive lens in the first rear-subunit 4B1 is too large and the dispersion of the material of the negative lens therein is too small. Therefore, when the lateral chromatic aberration is to be corrected, the power of the negative lens in the second rear-subunit 4B2 increases to increase a high-order aberration, to thereby degrade optical performance.

When the condition of Conditional Expression (1) exceeds the upper limit thereof, the dispersion of the material of the positive lens in the first rear-subunit 4B1 is too small and the dispersion of the material of the negative lens therein is too large. Therefore, it is difficult to excellently correct both the axial chromatic aberration and the lateral chromatic aberration. In particular, the lateral chromatic aberration is undercorrected, and hence the optical performance degrades.

When the condition of Conditional Expression (2) falls below the lower limit thereof, the dispersion of the material of the positive lens in the second rear-subunit 4B2 is too large and the dispersion of the material of the negative lens therein is too small. Therefore, it is difficult to excellently correct both the axial chromatic aberration and the lateral chromatic aberration. In particular, the lateral chromatic aberration is undercorrected, and hence the optical performance degrades.

In the respective embodiments, the numerical ranges of Conditional Expressions (1) and (2) are more desirably set as follows.

$$0.52 < \nu 1p/\nu 1n < 1.00 \tag{1a}$$

$$2.35 < \nu 2p/\nu 2n \tag{2a}$$

The value, ν2p/ν2n, indicated in Conditional Expression (2) is desirably smaller than 5.00 (more desirably smaller than 3.00).

In the respective embodiments, as described above, the lens structure of the rear subunit 4B located on the image side in the fourth lens unit R and the Abbe numbers of the materials of the lenses are suitably set. Therefore, the aberrations, particularly, the lateral chromatic aberration at the wide angle end is excellently corrected to realize a zoom lens system which has high optical performance with a wide angle, a high variable magnification, and a large diameter.

In the respective embodiments, it is more desirable to satisfy at least one of Conditional Expressions (3) to (7) described below (which are not conditional expressions essential for the invention in this application). When each of the conditional expressions is satisfied, a corresponding effect is obtained.

Assume that ν2p and θ2p indicate the average Abbe number and average partial dispersion ratio of the materials of the positive lenses in the second rear-subunit 4B2.

Assume that ν2n and θ2n indicate the Abbe number and partial dispersion ratio of the material of the negative lens in the second rear-subunit 4B2.

In this case, at least one of the following conditions is satisfied.

$$\theta 2n + 0.00162 \times \nu 2n < 0.670 \tag{3}$$

$$(\theta 2n - \theta 2p)/(\nu 2p - \nu 2n) < 0.0023 \tag{4}$$

The Abbe numbers and partial dispersion ratios of the optical members used in the respective embodiments are as follows.

When Ng, NF, Nd, and NC indicate refractive indexes with respect to the g-line, the F-line, the d-line, and the C-line of Fraunhofer lines, an Abbe number νd and a partial dispersion ratio θgd are defined by the following normally used expressions.

$$\nu d = (Nd-1)/(NF-NC)$$

$$\theta gd = (Ng-Nd)/(NF-NC)$$

Conditional Expressions (3) and (4) define the dispersions and partial dispersion ratios of the materials of the positive lens and the negative lens in the second rear-subunit 4B2.

In the respective embodiments, the second rear-subunit 4B2 included in the rear subunit 4B is high in incident height h of the off-axial principal ray, and hence the partial dispersion ratio of the material of the negative lens and a gradient of a partial dispersion ratio difference to a dispersion difference between the positive lens and the negative lens are suitably set.

Therefore, a secondary spectrum of the lateral chromatic aberration at the wide angle end is excellently corrected.

When the conditions of Conditional Expressions (3) and (4) are not satisfied, it is difficult to excellently correct both lateral chromatic aberrations on a short-wavelength side and a long-wavelength side, and hence the secondary spectrum degrades.

In the respective embodiments, the numerical ranges of Conditional Expressions (3) and (4) are desirably set as follows.

$$\theta 2n + 0.00162 \times \nu 2n < 0.660 \tag{3a}$$

$$(\theta 2n - \theta 2p)/(\nu 2p - \nu 2n) < 0.0022 \tag{4a}$$

The numerical ranges of Conditional Expressions (3) and (4) are more desirably set as follows.

$$\theta 2n + 0.00162 \times \nu 2n < 0.645 \tag{3b}$$

$$(\theta 2n - \theta 2p)/(\nu 2p - \nu 2n) < 0.0017 \tag{4b}$$

The value, "θ2n+0.00162×ν2n," indicated in Conditional Expression (3) is desirably larger than 0.400 (more desirably larger than 0.550).

The value, "(θ2n−θ2p)/(ν2p−ν2n)," indicated in Conditional Expression (4) is desirably larger than 0.00100 (more desirably larger than 0.00128).

When f1p, f2p, f1n, and f2n indicate a composite focal length of the positive lenses of the first rear-subunit 4B1, a composite focal length of the positive lenses of the second rear-subunit 4B2, a focal length of the negative lens of the first rear-subunit 4B1, and a focal length of the negative lens of the second rear-subunit 4B2, respectively, it is desirable to satisfy the following conditional expressions.

$$-1.1 < f1p/f1n < -0.3 \tag{5}$$

$$-1.3 < f2p/f2n < -0.5 \tag{6}$$

Note that a composite focal length fx of multiple lenses is expressed by the following expression $$1/fx = 1/f1 + 1/f2 + 1/f3 + \ldots$$

where f1, f2, f3, . . . indicate respective focal lengths of the multiple lenses.

When at least one (desirably both) of Conditional Expressions (5) and (6) is (are) satisfied, the aberrations (particularly, lateral chromatic aberration at wide angle end) may be excellently reduced (corrected) to provide a zoom lens system having high optical performance (wide angle, high varying magnification, and large diameter).

The conditions of Conditional Expressions (5) and (6) desirably satisfy the following numerical ranges.

$$-0.950 < f1p/f1n < -0.460 \tag{5a}$$

$$-1.15 < f2p/f2n < -0.65 \tag{6a}$$

The conditions of Conditional Expressions (5) and (6) more desirably satisfy the following numerical ranges.

$$-0.920 < f1p/f1n < -0.480 \tag{5b}$$

$$-1.07 < f2p/f2n < -0.70 \tag{6b}$$

Assume that IS indicates an image size (diagonal length) of an effective region (region used for actual image pickup) of a solid-state image pickup element (described in detail later) for receiving a subject image formed by a zoom lens system and fw indicates a focal length of the entire zoom lens system at the wide angle end. In this case, it is desirable to satisfy the following condition.

$$0.32 < fw/IS < 0.47 \quad (7)$$

When fw/IS does not satisfy the conditional expression (7), it is difficult to reduce a distortion in a case where image pickup is performed at a wide field angle (particularly, it is difficult to reduce the negative distortion at wide angle end).

The condition of Conditional Expression (7) more desirably satisfies the following numerical range.

$$0.38 < fw/IS < 0.42 \quad (7a)$$

In the respective embodiments, the lens unit (extender lens) IE for changing the focal length range of the entire system is removably inserted between the front subunit 4F and the rear subunit 4B in the fourth lens unit R.

In the wide angle end of the four-unit zoom lens system, the overcorrection of an axial chromatic aberration for the short wavelength, which is generated in the rear subunit 4B is cancelled with the undercorrection of the axial chromatic aberration for the short wavelength, which is generated in the front subunit 4F. In the case of the zoom lens system including the lens unit IE, it is necessary to take into account aberrations at the time of insertion of the lens unit IE. Therefore, it is not desirable to increase the amount of aberrations generated in lenses located in the object side of the lens unit IE in which the aberrations are increased or reduced at the time of insertion of the lens unit IE. Thus, it is necessary to reduce the amount of axial chromatic aberrations generated in the front subunit 4F and the rear subunit 4B.

In the zoom lens system including the lens unit IE, as the field angle is widened, it is desirable not to overcorrect the axial chromatic aberration for the short wavelength to a predetermined certain extent while overcorrecting the lateral chromatic aberration in the rear subunit 4B.

Therefore, in the case of the zoom lens system including the lens unit IE, when the rear subunit 4B is provided so as to satisfy Conditional Expressions (1), (2), (3), and (4) described above, the lateral chromatic aberration is more effectively corrected.

The structure of the rear subunit 4B (lens structure having refractive power in rear subunit 4B) desirably satisfy any one of the following structures.

(1) A structure includes, in order from the object side to the image side: a positive lens; a cemented lens constituted by a positive lens and a negative lens (regardless of order); a cemented lens constituted by a positive lens and a negative lens (regardless of order); and a positive lens.

(2) A structure includes, in order from the object side to the image side: a positive lens; a cemented lens constituted by, in order from the object side to the image side, a negative lens and a positive lens; a cemented lens constituted by, in order from the object side to the image side, a positive lens and a negative lens; and a positive lens.

(3) A structure includes, in order from the object side to the image side: a positive lens; a cemented lens constituted by, in order from the object side to the image side, a positive lens and a negative lens; a cemented lens constituted by, in order from the object side to the image side, a positive lens and a negative lens; and a positive lens.

(4) A structure includes, in order from the object side to the image side: a positive lens; a cemented lens constituted by, in order from the object side to the image side, a negative lens and a positive lens; a cemented lens constituted by, in order from the object side to the image side, a negative lens and a positive lens; and a positive lens.

(5) A structure includes, in order from the object side to the image side: a positive lens; a negative lens; a cemented lens constituted by, in order from the object side to the image side, a positive lens and a negative lens; and a positive lens.

(6) A structure includes, in order from the object side to the image side: a positive lens; a negative lens; a positive lens; a positive lens; a negative lens; and a positive lens.

(7) A structure includes, in order from the object side to the image side: a positive lens; a positive lens; a cemented lens constituted by, in order from the object side to the image side, a negative lens and a positive lens; a cemented lens constituted by, in order from the object side to the image side, a positive lens and a negative lens; and a positive lens.

The rear subunit 4B is provided with any one of the structures described above and to satisfy Conditional Expressions (1), (2), (3), and (4). Therefore, a reduction in size of the lens is achieved and various aberrations such as spherical aberration, coma, astigmatism, field curvature, and axial chromatic aberration, including lateral chromatic aberration are excellently corrected.

In the respective embodiments, the front subunit 4F includes, in order from the object side to the image side, a positive lens, a positive lens, and a cemented lens constituted by a positive lens and a negative lens. Thus, excellent optical performance is obtained over the entire zoom range.

FIG. 18 is a schematic diagram illustrating a principal portion of an image pickup apparatus (television camera system) using the zoom lens system according to each of the embodiments as an image pickup optical system. In FIG. 18, a zoom lens system 101 according to any one of Embodiments 1 to 7 and a camera (camera main body) 124 are provided. The zoom lens system 101 is detachably attached to the camera 124. An image pickup apparatus 125 is configured by attaching the zoom lens system 101 to the camera 124.

The zoom lens system 101 includes the first lens unit F, a magnification-varying section LZ, and the fourth lens unit R for imaging. The first lens unit F includes a focusing lens unit. The magnification-varying section LZ includes the second lens unit V which moves on the optical axis so as to vary the magnification and the third lens unit C which moves on the optical axis so as to correct an image plane variation due to magnification-varying.

The zoom lens system 101 includes the aperture stop SP. The fourth lens unit R includes the front lens subunit 4F, the lens unit (extender lens) IE which may be removably inserted onto the optical path, and the rear lens subunit 4B.

The lens unit IE is provided to change the focal length range of the entire system of the zoom lens system 101.

Drive mechanisms 114 and 115 such as helicoids or cams drive the first lens unit F and the magnification-varying section LZ, respectively, in the optical axis direction.

Motors (drive units) 116 to 118 are provided to electrically drive the drive mechanisms 114 and 115 and the aperture stop SP.

Detectors 119 to 121 such as encoders, potentiometers, or photosensors detect positions of the first lens unit F and the magnification-varying section LZ on the optical axis and a stop diameter of the aperture stop SP.

The camera 124 includes: a glass block 109 corresponding to an optical filter or a color separation prism in the camera 124; and a solid-state image pickup element (photoelectric transducer) 110 such as a CCD sensor or a CMOS sensor, for receiving a subject image formed by the zoom lens system 101. With the zoom lens system (image pickup lens) described above, an image of the subject (object) is formed on the solid-state image pickup element.

CPUs 111 and 122 control the various driving of the camera 124 and the main body of the zoom lens system 101, respectively.

When the zoom lens system according to the present invention is applied to the television camera system as described above, the image pickup apparatus having high optical performance is realized.

Hereinafter, Numerical Embodiments 1 to 7 corresponding to Embodiments 1 to 7 of the present invention are described. In the respective numerical embodiments, a surface number "i" is counted from the object side. In addition, ri indicates a curvature radius of an i-th surface counted from the object side and di indicates an interval between the i-th surface and an (i+1)-th surface which are counted from the object side. Further, Ni and νi indicate a refractive index and an Abbe number of an i-th optical material, respectively. In addition, f, fno, and 2ω indicate a focal length, an F-number, and a field angle of the entire system in a case of focusing on an infinite-distance object. In addition, Bf indicates a back focus and Y indicates an image height.

Last three surfaces correspond to a glass block such as a filter.

Assume that the optical axis direction is an X-axis, a direction perpendicular to the optical axis is an H axis, and a light traveling direction is positive. In this case, when R denotes a paraxial curvature radius, k denotes a conic constant, and B, C, D, E, A', B', C', and D' denote aspherical coefficients, an aspherical surface shape is expressed by the following expression:

$$X = \frac{H^2/R}{1+\sqrt{1-(1+k)(H/R)^2}} + BH^4 + CH^6 + DH^8 + EH^{10} + A'H^3 + B'H^5 + C'H^7 + D'H^9$$

With respect to the respective embodiments (respective numerical embodiments) described above, results obtained by calculating the values of the respective conditional expressions described above are represent in Table 1.

Numerical Embodiment 1

Screen Size - Diagonal Width 11 mm
f 4.45-57.85 Fno/1.90-2.80 2ω 102.0°-10.9°
Bf 4.9990 Y 5.5

|  | r | d | nd | ν |
|---|---|---|---|---|
| *1 | 227.195 | 2.50 | 1.7762 | 49.60 |
| 2 | 33.736 | 19.76 | | |
| 3 | 311.589 | 1.85 | 1.7584 | 52.32 |
| 4 | 80.391 | 13.54 | | |
| 5 | −80.728 | 1.75 | 1.7584 | 52.32 |
| 6 | −17642.010 | 1.30 | | |
| 7 | 135.169 | 6.62 | 1.8126 | 25.42 |
| 8 | −339.711 | 1.16 | | |
| 9 | 328.904 | 9.40 | 1.5183 | 64.14 |
| *10 | −74.094 | 11.86 | | |
| 11 | 1211.778 | 8.57 | 1.4891 | 70.23 |
| 12 | −67.682 | 1.65 | 1.8881 | 40.76 |
| 13 | −126.215 | 0.20 | | |
| 14 | 182.391 | 1.65 | 2.0117 | 28.30 |
| 15 | 55.727 | 10.56 | 1.4985 | 81.54 |
| 16 | −405.898 | 0.20 | | |
| 17 | 130.732 | 9.01 | 1.4985 | 81.54 |
| 18 | −91.216 | 0.20 | | |
| 19 | 57.687 | 7.79 | 1.6229 | 60.29 |
| 20 | 1234.500 | variable | | |
| 21 | 52.721 | 0.75 | 1.8881 | 40.76 |
| 22 | 13.435 | 3.29 | | |
| 23 | 67.192 | 0.75 | 1.8881 | 40.76 |
| 24 | 36.490 | 2.83 | | |
| 25 | −48.656 | 4.75 | 1.8126 | 25.42 |
| 26 | −12.990 | 0.80 | 1.8881 | 40.76 |
| 27 | −1003.160 | 0.20 | | |
| 28 | 33.652 | 2.54 | 1.6942 | 31.07 |
| 29 | 1299.417 | variable | | |
| 30 | −26.243 | 0.75 | 1.7584 | 52.32 |
| 31 | 52.073 | 2.45 | 1.8164 | 22.76 |
| 32 | −173.421 | variable | | |
| 33 | (stop) | 1.40 | | |
| 34 | 14228.195 | 3.80 | 1.5914 | 61.14 |
| 35 | −38.640 | 0.20 | | |
| 36 | 92.642 | 3.10 | 1.4891 | 70.23 |
| 37 | −152.499 | 0.20 | | |
| 38 | 52.379 | 6.64 | 1.4891 | 70.23 |
| 39 | −39.203 | 1.20 | 1.8881 | 40.76 |
| 40 | 6905.542 | 34.00 | | |
| 41 | 65.930 | 5.39 | 1.5783 | 41.50 |
| 42 | −55.384 | 3.53 | | |
| 43 | 537.147 | 1.20 | 1.8881 | 40.76 |
| 44 | 23.184 | 5.27 | 1.5991 | 39.24 |
| 45 | −8948.954 | 0.24 | | |
| 46 | 49.707 | 6.16 | 1.5183 | 64.14 |
| 47 | −25.046 | 1.20 | 2.0117 | 28.30 |
| 48 | −456.658 | 0.39 | | |
| 49 | 62.510 | 4.70 | 1.4891 | 70.23 |
| 50 | −41.285 | 4.00 | | |
| 51 | ∞ | 33.00 | 1.6117 | 46.44 |
| 52 | ∞ | 13.20 | 1.5187 | 64.17 |
| 53 | ∞ | 5.00 | | |

Focal Length

| 4.45 | 13.795 | 57.85 |
|---|---|---|

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| R | 227.195 | k | −54.217 | B | $1.9066 \cdot 10^{-6}$ |
|---|---|---|---|---|---|
| C | $3.7310 \cdot 10^{-11}$ | D | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$ | | |
| C' | $2.4226 \cdot 10^{-12}$ | D' | $2.4438 \cdot 10^{-15}$ | | |

Tenth Surface

| R | −74.094 | k | −2.282 | B | $-2.0884 \cdot 10^{-7}$ |
|---|---|---|---|---|---|
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

(Numerical Embodiment of Lens Unit IE)

Screen Size: Diagonal Width 11 mm
f 8.9-115.7 Fno/3.80-5.60 2ω 63.4°-5.4°
Bf 4.9962 Y 5.5

| | r | d | nd | ν |
|---|---|---|---|---|
| 1 | 40.307 | 6.08 | 1.4985 | 81.54 |
| 2 | −75.735 | 0.24 | | |
| 3 | 36.904 | 5.04 | 1.6055 | 60.64 |

Screen Size: Diagonal Width 11 mm
f 8.9-115.7 Fno/3.80-5.60 2ω 63.4°-5.4°
Bf 4.9962 Y 5.5

|   | r        | d     | nd     | ν     |
|---|----------|-------|--------|-------|
| 4 | −107.008 | 0.84  | 1.8548 | 23.90 |
| 5 | 87.515   | 11.76 |        |       |
| 6 | −116.601 | 3.01  | 1.8164 | 22.76 |
| 7 | −23.612  | 0.56  | 1.8202 | 46.62 |
| 8 | 20.218   | 4.98  |        |       |

Numerical Embodiment 2

Screen Size - Diagonal Width 11 mm
f 4.45-57.85 Fno/1.90-2.80 2ω 102.0°-10.9°
BF 4.9931 Y 5.5

|     | r          | d        | nd     | ν     |
|-----|------------|----------|--------|-------|
| *1  | 227.195    | 2.50     | 1.7762 | 49.60 |
| 2   | 33.736     | 19.76    |        |       |
| 3   | 311.589    | 1.85     | 1.7584 | 52.32 |
| 4   | 80.391     | 13.54    |        |       |
| 5   | −80.728    | 1.75     | 1.7584 | 52.32 |
| 6   | −17642.010 | 1.30     |        |       |
| 7   | 135.169    | 6.62     | 1.8126 | 25.42 |
| 8   | −339.711   | 1.16     |        |       |
| 9   | 328.904    | 9.40     | 1.5183 | 64.14 |
| *10 | −74.094    | 11.86    |        |       |
| 11  | 1211.778   | 8.57     | 1.4891 | 70.23 |
| 12  | −67.682    | 1.65     | 1.8881 | 40.76 |
| 13  | −126.215   | 0.20     |        |       |
| 14  | 182.391    | 1.65     | 2.0117 | 28.30 |
| 15  | 55.727     | 10.56    | 1.4985 | 81.54 |
| 16  | −405.898   | 0.20     |        |       |
| 17  | 130.732    | 9.01     | 1.4985 | 81.54 |
| 18  | −91.216    | 0.20     |        |       |
| 19  | 57.687     | 7.79     | 1.6229 | 60.29 |
| 20  | 1234.500   | variable |        |       |
| 21  | 52.721     | 0.75     | 1.8881 | 40.76 |
| 22  | 13.435     | 3.29     |        |       |
| 23  | 67.192     | 0.75     | 1.8881 | 40.76 |
| 24  | 36.490     | 2.83     |        |       |
| 25  | −48.656    | 4.75     | 1.8126 | 25.42 |
| 26  | −12.990    | 0.80     | 1.8881 | 40.76 |
| 27  | −1003.160  | 0.20     |        |       |
| 28  | 33.652     | 2.54     | 1.6942 | 31.07 |
| 29  | 1299.417   | variable |        |       |
| 30  | −26.243    | 0.75     | 1.7584 | 52.32 |
| 31  | 52.073     | 2.45     | 1.8164 | 22.76 |
| 32  | −173.421   | variable |        |       |
| 33  | (stop)     | 1.40     |        |       |
| 34  | −15623.885 | 3.39     | 1.5914 | 61.14 |
| 35  | −45.151    | 0.20     |        |       |
| 36  | 853.121    | 3.12     | 1.4891 | 70.23 |
| 37  | −105.776   | 0.20     |        |       |
| 38  | 41.089     | 7.95     | 1.4891 | 70.23 |
| 39  | −37.288    | 1.20     | 1.8881 | 40.76 |
| 40  | −252.494   | 34.00    |        |       |
| 41  | 591.873    | 4.79     | 1.5967 | 35.31 |
| 42  | −41.730    | 0.20     |        |       |
| 43  | 88.052     | 5.27     | 1.5967 | 35.31 |
| 44  | −42.116    | 1.20     | 1.8881 | 40.76 |
| 45  | −296.998   | 0.24     |        |       |
| 46  | 37.310     | 6.03     | 1.4891 | 70.23 |
| 47  | −35.443    | 1.20     | 2.0117 | 28.30 |
| 48  | 44.112     | 0.81     |        |       |
| 49  | 33.024     | 4.97     | 1.4985 | 81.54 |
| 50  | −55.651    | 4.00     |        |       |
| 51  | ∞          | .00      | 1.6117 | 46.44 |
| 52  | ∞          | 13.20    | 1.5187 | 64.17 |
| 53  | ∞          | 5.00     |        |       |

Screen Size - Diagonal Width 11 mm
f 4.45-57.85 Fno/1.90-2.80 2ω 102.0°-10.9°
BF 4.9931 Y 5.5

| Focal Length |        |       |
|--------------|--------|-------|
| 4.45         | 13.795 | 57.85 |

| Variable interval |       |       |       |
|-------------------|-------|-------|-------|
| d20               | 0.91  | 28.60 | 44.72 |
| d29               | 42.27 | 11.11 | 6.22  |
| d32               | 9.00  | 12.47 | 1.24  |

Aspherical Surface Shape

First Surface

| R  | 227.195              | k  | −54.217               | B | $1.9066 \cdot 10^{-6}$  |
| C  | $3.7310 \cdot 10^{-11}$ | D  | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$  |   |                         |
| C' | $2.4226 \cdot 10^{-12}$ | D' | $2.4438 \cdot 10^{-15}$  |   |                         |

Tenth Surface

| R  | −74.094                | k  | −2.282                  | B | $-2.0884 \cdot 10^{-7}$  |
| C  | $2.9660 \cdot 10^{-11}$ | D  | $3.4878 \cdot 10^{-13}$  | E | $-1.1872 \cdot 10^{-16}$ |
| A' | $-6.3672 \cdot 10^{-7}$ | B' | $5.6104 \cdot 10^{-10}$  | C' | $-1.1116 \cdot 10^{-11}$ |
| D' | $-3.1827 \cdot 10^{-16}$ |    |                          |   |                         |

Numerical Embodiment 3

Screen Size - Diagonal Width 11 mm
f 4.45-57.85 Fno/1.90-2.80 2ω 102.0°-10.9°
BF 4.9970 Y 5.5

|     | r          | d        | nd     | ν     |
|-----|------------|----------|--------|-------|
| *1  | 227.195    | 2.50     | 1.7762 | 49.60 |
| 2   | 33.736     | 19.76    |        |       |
| 3   | 311.589    | 1.85     | 1.7584 | 52.32 |
| 4   | 80.391     | 13.54    |        |       |
| 5   | −80.728    | 1.75     | 1.7584 | 52.32 |
| 6   | −17642.010 | 1.30     |        |       |
| 7   | 135.169    | 6.62     | 1.8126 | 25.42 |
| 8   | −339.711   | 1.16     |        |       |
| 9   | 328.904    | 9.40     | 1.5183 | 64.14 |
| *10 | −74.094    | 11.86    |        |       |
| 11  | 1211.778   | 8.57     | 1.4891 | 70.23 |
| 12  | −67.682    | 1.65     | 1.8881 | 40.76 |
| 13  | −126.215   | 0.20     |        |       |
| 14  | 182.391    | 1.65     | 2.0117 | 28.30 |
| 15  | 55.727     | 10.56    | 1.4985 | 81.54 |
| 16  | −405.898   | 0.20     |        |       |
| 17  | 130.732    | 9.01     | 1.4985 | 81.54 |
| 18  | −91.216    | 0.20     |        |       |
| 19  | 57.687     | 7.79     | 1.6229 | 60.29 |
| 20  | 1234.500   | variable |        |       |
| 21  | 52.721     | 0.75     | 1.8881 | 40.76 |
| 22  | 13.435     | 3.29     |        |       |
| 23  | 67.192     | 0.75     | 1.8881 | 40.76 |
| 24  | 36.490     | 2.83     |        |       |
| 25  | −48.656    | 4.75     | 1.8126 | 25.42 |
| 26  | −12.990    | 0.80     | 1.8881 | 40.76 |
| 27  | −1003.160  | 0.20     |        |       |
| 28  | 33.652     | 2.54     | 1.6942 | 31.07 |
| 29  | 1299.417   | variable |        |       |
| 30  | −26.243    | 0.75     | 1.7584 | 52.32 |
| 31  | 52.073     | 2.45     | 1.8164 | 22.76 |
| 32  | −173.421   | variable |        |       |
| 33  | (stop)     | 1.40     |        |       |
| 34  | −4484.945  | 4.23     | 1.5914 | 61.14 |
| 35  | −33.960    | 0.20     |        |       |
| 36  | 382.348    | 3.47     | 1.4891 | 70.23 |
| 37  | −84.792    | 0.20     |        |       |

-continued

Screen Size - Diagonal Width 11 mm
f 4.45-57.85 Fno/1.90-2.80 2ω 102.0°-10.9°
BF 4.9970 Y 5.5

| | | | | |
|---|---|---|---|---|
| 38 | 40.593 | 7.14 | 1.4891 | 70.23 |
| 39 | −39.952 | 1.20 | 1.8881 | 40.76 |
| 40 | 212.532 | 34.00 | | |
| 41 | 33.473 | 6.27 | 1.5783 | 41.50 |
| 42 | −78.955 | 0.81 | | |
| 43 | −134.302 | 1.20 | 1.8881 | 40.76 |
| 44 | 27.281 | 5.64 | 1.5967 | 35.31 |
| 45 | −164.887 | 5.27 | | |
| 46 | 398.087 | 1.20 | 2.0117 | 28.30 |
| 47 | 23.958 | 6.47 | 1.4891 | 70.23 |
| 48 | −48.297 | 0.15 | | |
| 49 | 27.896 | 4.93 | 1.4891 | 70.23 |
| 50 | −377.442 | 4.00 | | |
| 51 | ∞ | 33.00 | 1.6117 | 46.44 |
| 52 | ∞ | 13.20 | 1.5187 | 64.17 |
| 53 | ∞ | 5.00 | | |

Focal Length

| | | |
|---|---|---|
| 4.45 | 13.795 | 57.85 |

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| | | | | | |
|---|---|---|---|---|---|
| R | 227.195 | k | −54.217 | B | $1.9066 \cdot 10^{-6}$ |
| C | $3.7310 \cdot 10^{-11}$ | D | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$ | | |
| C' | $2.4226 \cdot 10^{-12}$ | D' | $2.4438 \cdot 10^{-15}$ | | |

Tenth Surface

| | | | | | |
|---|---|---|---|---|---|
| R | −74.094 | k | −2.282 | B | $-2.0884 \cdot 10^{-7}$ |
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

Numerical Embodiment 4

Screen Size - Diagonal Width 11 mm
f 4.45-57.85 Fno/1.90-2.80 2ω 102.0°-10.9°
BF 4.9978 Y 5.5

| | r | d | nd | ν |
|---|---|---|---|---|
| *1 | 227.195 | 2.50 | 1.7762 | 49.60 |
| 2 | 33.736 | 19.76 | | |
| 3 | 311.589 | 1.85 | 1.7584 | 52.32 |
| 4 | 80.391 | 13.54 | | |
| 5 | −80.728 | 1.75 | 1.7584 | 52.32 |
| 6 | −17642.010 | 1.30 | | |
| 7 | 135.169 | 6.62 | 1.8126 | 25.42 |
| 8 | −339.711 | 1.16 | | |
| 9 | 328.904 | 9.40 | 1.5183 | 64.14 |
| *10 | −74.094 | 11.86 | | |
| 11 | 1211.778 | 8.57 | 1.4891 | 70.23 |
| 12 | −67.682 | 1.65 | 1.8881 | 40.76 |
| 13 | −126.215 | 0.20 | | |
| 14 | 182.391 | 1.65 | 2.0117 | 28.30 |
| 15 | 55.727 | 10.56 | 1.4985 | 81.54 |
| 16 | −405.898 | 0.20 | | |
| 17 | 130.732 | 9.01 | 1.4985 | 81.54 |
| 18 | −91.216 | 0.20 | | |
| 19 | 57.687 | 7.79 | 1.6229 | 60.29 |
| 20 | 1234.500 | variable | | |
| 21 | 52.721 | 0.75 | 1.8881 | 40.76 |
| 22 | 13.435 | 3.29 | | |
| 23 | 67.192 | 0.75 | 1.8881 | 40.76 |
| 24 | 36.490 | 2.83 | | |
| 25 | −48.656 | 4.75 | 1.8126 | 25.42 |
| 26 | −12.990 | 0.80 | 1.8881 | 40.76 |
| 27 | −1003.160 | 0.20 | | |
| 28 | 33.652 | 2.54 N16 | 1.6942 ν16 | 31.07 |
| 29 | 1299.417 | variable | | |
| 30 | −26.243 | 0.75 | 1.7584 | 52.32 |
| 31 | 52.073 | 2.45 | 1.8164 | 22.76 |
| 32 | −173.421 | variable | | |
| 33 | (stop) | 1.40 | | |
| 34 | −13787.893 | 3.92 | 1.5914 | 61.14 |
| 35 | −36.917 | 0.20 | | |
| 36 | 106.127 | 3.35 | 1.4891 | 70.23 |
| 37 | −95.836 | 0.20 | | |
| 38 | 48.085 | 6.72 | 1.4891 | 70.23 |
| 39 | −38.635 | 1.20 | 1.8881 | 40.76 |
| 40 | 293.252 | 34.00 | | |
| 41 | 204.940 | 4.18 | 1.7044 | 30.13 |
| 42 | −54.231 | 2.66 | | |
| 43 | 39.548 | 1.20 | 1.7323 | 54.68 |
| 44 | 21.900 | 1.74 | | |
| 45 | 24.680 | 8.75 | 1.4985 | 81.54 |
| 46 | −25.451 | 1.20 | 2.0117 | 28.30 |
| 47 | 436.838 | 2.00 | | |
| 48 | 90.478 | 5.06 | 1.4891 | 70.23 |
| 49 | −31.140 | 4.00 | | |
| 50 | ∞ | 33.00 | 1.6117 | 46.44 |
| 51 | ∞ | 13.20 | 1.5187 | 64.17 |
| 52 | ∞ | 5.00 | | |

Focal Length

| | | |
|---|---|---|
| 4.45 | 13.795 | 57.85 |

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| | | | | | |
|---|---|---|---|---|---|
| R | 227.195 | k | −54.217 | B | $1.9066 \cdot 10^{-6}$ |
| C | $3.7310 \cdot 10^{-11}$ | D | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$ | | |
| C' | $2.4226 \cdot 10^{-12}$ | D' | $2.4438 \cdot 10^{-15}$ | | |

Tenth Surface

| | | | | | |
|---|---|---|---|---|---|
| R | −74.094 | k | −2.282 | B | $-2.0884 \cdot 10^{-7}$ |
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

Numerical Embodiment 5

Screen Size - Diagonal Width 11 mm
f 4.45-57.85 Fno/1.90-2.80 2ω 102.0°-10.9°
BF 4.9974 Y 5.5

| | r | d | nd | ν |
|---|---|---|---|---|
| *1 | 227.195 | 2.50 | 1.7762 | 49.60 |
| 2 | 33.736 | 19.76 | | |
| 3 | 311.589 | 1.85 | 1.7584 | 52.32 |
| 4 | 80.391 | 13.54 | | |
| 5 | −80.728 | 1.75 | 1.7584 | 52.32 |

-continued

Screen Size - Diagonal Width 11 mm
f 4.45-57.85 Fno/1.90-2.80 2ω 102.0°-10.9°
BF 4.9974 Y 5.5

| | r | d | nd | ν |
|---|---|---|---|---|
| 6 | −17642. | 1.30 | | |
| 7 | 135.169 | 6.62 | 1.8126 | 25.42 |
| 8 | −339.711 | 1.16 | | |
| 9 | 328.904 | 9.40 | 1.5183 | 64.14 |
| *10 | −74.094 | 11.86 | | |
| 11 | 1211.778 | 8.57 | 1.4891 | 70.23 |
| 12 | −67.682 | 1.65 | 1.8881 | 40.76 |
| 13 | −126.215 | 0.20 | | |
| 14 | 182.391 | 1.65 | 2.0117 | 28.30 |
| 15 | 55.727 | 10.56 | 1.4985 | 81.54 |
| 16 | −405.898 | 0.20 | | |
| 17 | 130.732 | 9.01 | 1.4985 | 81.54 |
| 18 | −91.216 | 0.20 | | |
| 19 | 57.687 | 7.79 | 1.6229 | 60.29 |
| 20 | 1234.500 | variable | | |
| 21 | 52.721 | 0.75 | 1.8881 | 40.76 |
| 22 | 13.435 | 3.29 | | |
| 23 | 67.192 | 0.75 | 1.8881 | 40.76 |
| 24 | 36.490 | 2.83 | | |
| 25 | −48.656 | 4.75 | 1.8126 | 25.42 |
| 26 | −12.990 | 0.80 | 1.8881 | 40.76 |
| 27 | −1003.160 | 0.20 | | |
| 28 | 33.652 | 2.54 N16 | 1.6942 | 31.07 |
| 29 | 1299.417 | variable | | |
| 30 | −26.243 | 0.75 | 1.7584 | 52.32 |
| 31 | 52.073 | 2.45 | 1.8164 | 22.76 |
| 32 | −173.421 | variable | | |
| 33 | (stop) | 1.40 | | |
| 34 | 606.159 | 3.51 | 1.5914 | 61.14 |
| 35 | −46.528 | 0.20 | | |
| 36 | 96.040 | 3.60 | 1.4891 | 70.23 |
| 37 | −97.979 | 0.20 | | |
| 38 | 44.810 | 6.80 | 1.4891 | 70.23 |
| 39 | −44.033 | 1.20 | 1.8881 | 40.76 |
| 40 | 320.626 | 34.00 | | |
| 41 | 45.982 | 5.59 | 1.5783 | 41.50 |
| 42 | −67.644 | 1.94 | | |
| 43 | −178.506 | 1.20 | 1.8881 | 40.76 |
| 44 | 28.093 | 1.14 | | |
| 45 | 38.911 | 4.99 | 1.5991 | 39.24 |
| 46 | −77.231 | 0.24 | | |
| 47 | 44.915 | 5.46 | 1.4891 | 70.23 |
| 48 | −39.741 | 1.82 | | |
| 49 | −31.164 | 1.20 | 2.0117 | 28.30 |
| 50 | 232.885 | 1.14 | | |
| 51 | 44.785 | 5.91 | 1.4891 | 70.23 |
| 52 | −33.328 | 4.00 | | |
| 53 | ∞ | 33.00 | 1.6117 | 46.44 |
| 54 | ∞ | 13.20 | 1.5187 | 64.17 |
| 55 | ∞ | 5.00 | | |

Focal Length

| 4.45 | 13.795 | 57.85 |
|---|---|---|

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| R | 227.195 | k | −54.217 | B | $1.9066 \cdot 10^{-6}$ |
|---|---|---|---|---|---|
| C | $3.7310 \cdot 10^{-11}$ | D | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$ | | |
| C' | $2.4226 \cdot 10^{-12}$ | D' | $2.4438 \cdot 10^{-15}$ | | |

Tenth Surface

| R | −74.094 | k | −2.282 | B | $-2.0884 \cdot 10^{-7}$ |
|---|---|---|---|---|---|
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

Numerical Embodiment 6

Screen Size - Diagonal Width 11 mm
f 4.45-57.85 Fno/1.90-2.80 2ω 102.0°-10.9°
BF 4.9951 Y 5.5

| | r | d | nd | ν |
|---|---|---|---|---|
| *1 | 227.195 | 2.50 | 1.7762 | 49.60 |
| 2 | 33.736 | 19.76 | | |
| 3 | 311.589 | 1.85 | 1.7584 | 52.32 |
| 4 | 80.391 | 13.54 | | |
| 5 | −80.728 | 1.75 | 1.7584 | 52.32 |
| 6 | −17642.010 | 1.30 | | |
| 7 | 135.169 | 6.62 | 1.8126 | 25.42 |
| 8 | −339.711 | 1.16 | | |
| 9 | 328.904 | 9.40 | 1.5183 | 64.14 |
| *10 | −74.094 | 11.86 | | |
| 11 | 1211.778 | 8.57 | 1.4891 | 70.23 |
| 12 | −67.682 | 1.65 | 1.8881 | 40.76 |
| 13 | −126.215 | 0.20 | | |
| 14 | 182.391 | 1.65 | 2.0117 | 28.30 |
| 15 | 55.727 | 10.56 | 1.4985 | 81.54 |
| 16 | −405.898 | 0.20 | | |
| 17 | 130.732 | 9.01 | 1.4985 | 81.54 |
| 18 | −91.216 | 0.20 | | |
| 19 | 57.687 | 7.79 | 1.6229 | 60.29 |
| 20 | 1234.500 | variable | | |
| 21 | 52.721 | 0.75 | 1.8881 | 40.76 |
| 22 | 13.435 | 3.29 | | |
| 23 | 67.192 | 0.75 | 1.8881 | 40.76 |
| 24 | 36.490 | 2.83 | | |
| 25 | −48.656 | 4.75 | 1.8126 | 25.42 |
| 26 | −12.990 | 0.80 | 1.8881 | 40.76 |
| 27 | −1003.160 | 0.20 | | |
| 28 | 33.652 | 2.54 | 1.6942 | 31.07 |
| 29 | 1299.417 | variable | | |
| 30 | −26.243 | 0.75 | 1.7584 | 52.32 |
| 31 | 52.073 | 2.45 | 1.8164 | 22.76 |
| 32 | −173.421 | variable | | |
| 33 | (stop) | 1.40 | | |
| 34 | −21035.899 | 3.57 N19 | 1.5914 ν19 | 61.14 |
| 35 | −41.941 | 0.20 | | |
| 36 | 122.171 | 3.69 N20 | 1.4891 ν20 | 70.23 |
| 37 | −125.981 | 0.20 | | |
| 38 | 51.909 | 6.78 N21 | 1.4891 ν21 | 70.23 |
| 39 | −39.935 | 1.20 N22 | 1.8881 ν22 | 40.76 |
| 40 | −544.175 | 34.00 | | |
| 41 | 131.979 | 3.75 N23 | 1.5783 ν23 | 41.50 |
| 42 | −107.599 | 0.20 | | |
| 43 | 58.782 | 5.12 N24 | 1.5783 ν24 | 41.50 |
| 44 | −67.480 | 0.20 | | |
| 45 | −339.467 | 1.20 N25 | 1.8881 ν25 | 40.76 |
| 46 | 22.761 | 5.32 N26 | 1.5991 ν26 | 39.24 |
| 47 | 252.987 | 0.24 | | |
| 48 | 52.074 | 6.32 | 1.5183 | 64.14 |
| 49 | −25.243 | 1.20 | 2.0117 | 28.30 |
| 50 | 2390.369 | 0.28 | | |
| 51 | 61.444 | 4.60 | 1.4891 | 70.23 |
| 52 | −41.699 | 4.00 | | |
| 53 | ∞ | 33.00 | 1.6117 | 46.44 |
| 54 | ∞ | 13.20 | 1.5187 | 64.17 |
| 55 | ∞ | 5.00 | | |

Focal Length

| 4.45 | 13.795 | 57.85 |
|---|---|---|

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| R | 227.195 | k | −54.217 | B | $1.9066 \cdot 10^{-6}$ |
|---|---|---|---|---|---|
| C | $3.7310 \cdot 10^{-11}$ | D | $-1.9152 \cdot 10^{-13}$ | E | $-6.7753 \cdot 10^{-19}$ |

-continued

Screen Size - Diagonal Width 11 mm
f 4.45-57.85 Fno/1.90-2.80 2ω 102.0°-10.9°
BF 4.9951 Y 5.5

| | | | |
|---|---|---|---|
| A' | $-4.1287 \cdot 10^{-6}$ | B' | $-1.3218 \cdot 10^{-8}$ |
| C' | $2.4226 \cdot 10^{-12}$ | D' | $2.4438 \cdot 10^{-15}$ |

Tenth Surface

| | | | | | |
|---|---|---|---|---|---|
| R | $-74.094$ | k | $-2.282$ | B | $-2.0884 \cdot 10^{-7}$ |
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

Numerical Embodiment 7

Screen Size - Diagonal Width 11 mm
f 4.45-57.85 Fno/1.90-2.80 2ω 102.0°-10.9°
BF 4.9931 Y 5.5

| | r | d | nd | ν |
|---|---|---|---|---|
| *1 | 227.195 | 2.50 | 1.7762 | 49.60 |
| 2 | 33.736 | 19.76 | | |
| 3 | 311.589 | 1.85 | 1.7584 | 52.32 |
| 4 | 80.391 | 13.54 | | |
| 5 | -80.728 | 1.75 | 1.7584 | 52.32 |
| 6 | -17642.010 | 1.30 | | |
| 7 | 135.169 | 6.62 | 1.8126 | 25.42 |
| 8 | -339.711 | 1.16 | | |
| 9 | 328.904 | 9.40 | 1.5183 | 64.14 |
| *10 | -74.094 | 11.86 | | |
| 11 | 1211.778 | 8.57 | 1.4891 | 70.23 |
| 12 | -67.682 | 1.65 | 1.8881 | 40.76 |
| 13 | -126.215 | 0.20 | | |
| 14 | 182.391 | 1.65 | 2.0117 | 28.30 |
| 15 | 55.727 | 10.56 | 1.4985 | 81.54 |
| 16 | -405.898 | 0.20 | | |
| 17 | 130.732 | 9.01 | 1.4985 | 81.54 |
| 18 | -91.216 | 0.20 | | |
| 19 | 57.687 | 7.79 | 1.6229 | 60.29 |
| 20 | 1234.500 | variable | | |
| 21 | 52.721 | 0.75 | 1.8881 | 40.76 |
| 22 | 13.435 | 3.29 | | |
| 23 | 67.192 | 0.75 | 1.8881 | 40.76 |
| 24 | 36.490 | 2.83 | | |
| 25 | -48.656 | 4.75 | 1.8126 | 25.42 |
| 26 | -12.990 | 0.80 | 1.8881 | 40.76 |
| 27 | -1003.160 | 0.20 | | |
| 28 | 33.652 | 2.54 | 1.6942 | 31.07 |
| 29 | 1299.417 | variable | | |
| 30 | -26.243 | 0.75 | 1.7584 | 52.32 |
| 31 | 52.073 | 2.45 | 1.8164 | 22.76 |
| 32 | -173.421 | variable | | |
| 33 | (stop) | 1.40 | | |
| 34 | -26969.015 | 3.80 | 1.5914 | 61.14 |
| 35 | -38.478 | 0.20 | | |
| 36 | 102.927 | 3.25 | 1.4891 | 70.23 |
| 37 | -129.303 | 0.20 | | |
| 38 | 52.142 | 6.70 | 1.4891 | 70.23 |
| 39 | -39.230 | 1.20 | 1.8881 | 40.76 |
| 40 | 3435.984 | 34.00 | | |
| 41 | 60.084 | 5.31 | 1.5783 | 41.50 |
| 42 | -59.864 | 3.06 | | |
| 43 | 440.992 | 1.20 | 1.8881 | 40.76 |
| 44 | 21.290 | 6.12 | 1.5967 | 35.31 |
| 45 | -227.554 | 0.24 | | |
| 46 | 80.690 | 5.53 | 1.5183 | 64.14 |
| 47 | -25.508 | 1.20 | 1.8126 | 25.42 |
| 48 | 246.480 | 2.06 | | |
| 49 | 44.046 | 4.77 | 1.4891 | 70.23 |
| 50 | -57.645 | 4.00 | | |
| 51 | ∞ | 33.00 | 1.6117 | 46.44 |
| 52 | ∞ | 13.20 | 1.5187 | 64.17 |
| 53 | ∞ | 5.00 | | |

-continued

Screen Size - Diagonal Width 11 mm
f 4.45-57.85 Fno/1.90-2.80 2ω 102.0°-10.9°
BF 4.9931 Y 5.5

Focal Length

| 4.45 | 13.795 | 57.85 |
|---|---|---|

Variable Interval

| | | | |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Surface Shape

First Surface

| | | | | | |
|---|---|---|---|---|---|
| R | 227.195 | k | $-54.217$ | B | $1.9066 \cdot 10^{-6}$ |
| C | $3.7310 \cdot 10^{-11}$ | D | $-1.9152 \cdot 10^{-13}$ | E | $-6.7753 \cdot 10^{-19}$ |
| A' | $-4.1287 \cdot 10^{-6}$ | B' | $-1.3218 \cdot 10^{-8}$ | | |
| C' | $2.4226 \cdot 10^{-12}$ | D' | $2.4438 \cdot 10^{-15}$ | | |

Tenth Surface

| | | | | | |
|---|---|---|---|---|---|
| R | $-74.094$ | k | $-2.282$ | B | $-2.0884 \cdot 10^{-7}$ |
| C | $2.9660 \cdot 10^{-11}$ | D | $3.4878 \cdot 10^{-13}$ | E | $-1.1872 \cdot 10^{-16}$ |
| A' | $-6.3672 \cdot 10^{-7}$ | B' | $5.6104 \cdot 10^{-10}$ | C' | $-1.1116 \cdot 10^{-11}$ |
| D' | $-3.1827 \cdot 10^{-16}$ | | | | |

TABLE 1

| Conditional expression | Embodiment | | | | | | |
|---|---|---|---|---|---|---|---|
| | 1 | 2 | 3 | 4 | 5 | 6 | 7 |
| 1 | 0.99 | 0.87 | 0.94 | 0.55 | 0.99 | 0.99 | 0.94 |
| 2 | 2.37 | 2.68 | 2.48 | 2.68 | 2.48 | 2.37 | 2.64 |
| 3 | 0.644 | 0.644 | 0.644 | 0.644 | 0.644 | 0.644 | 0.657 |
| 4 | 0.00168 | 0.00135 | 0.00162 | 0.00135 | 0.00162 | 0.00168 | 0.00200 |
| 5 | -0.817 | -0.503 | -0.797 | -0.888 | -0.843 | -0.802 | -0.804 |
| 6 | -0.768 | -1.042 | -0.819 | -0.723 | -0.774 | -0.826 | -0.773 |
| 7 | 0.405 | 0.405 | 0.405 | 0.405 | 0.405 | 0.405 | 0.405 |

Figure 3B:
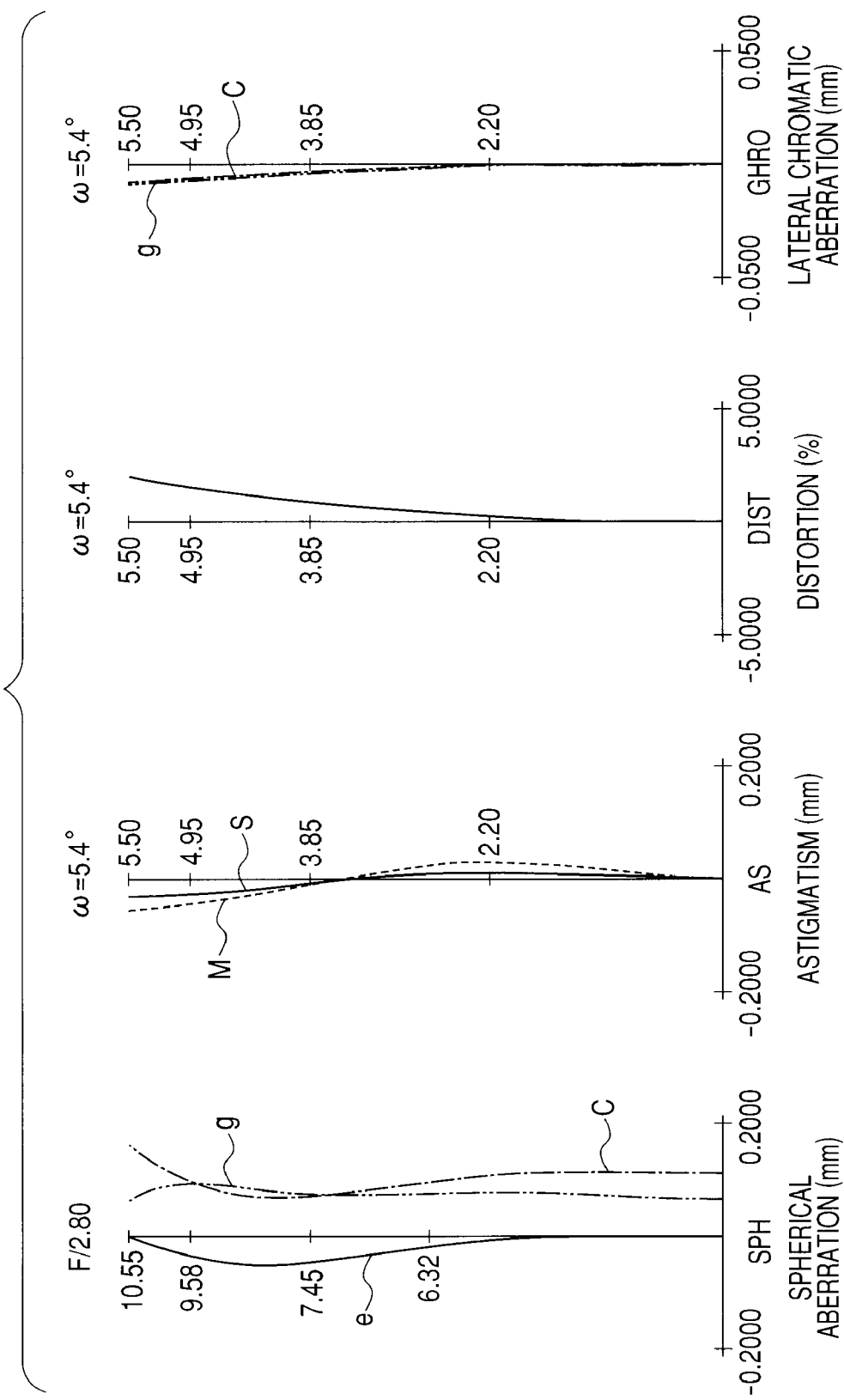
Figure 4:
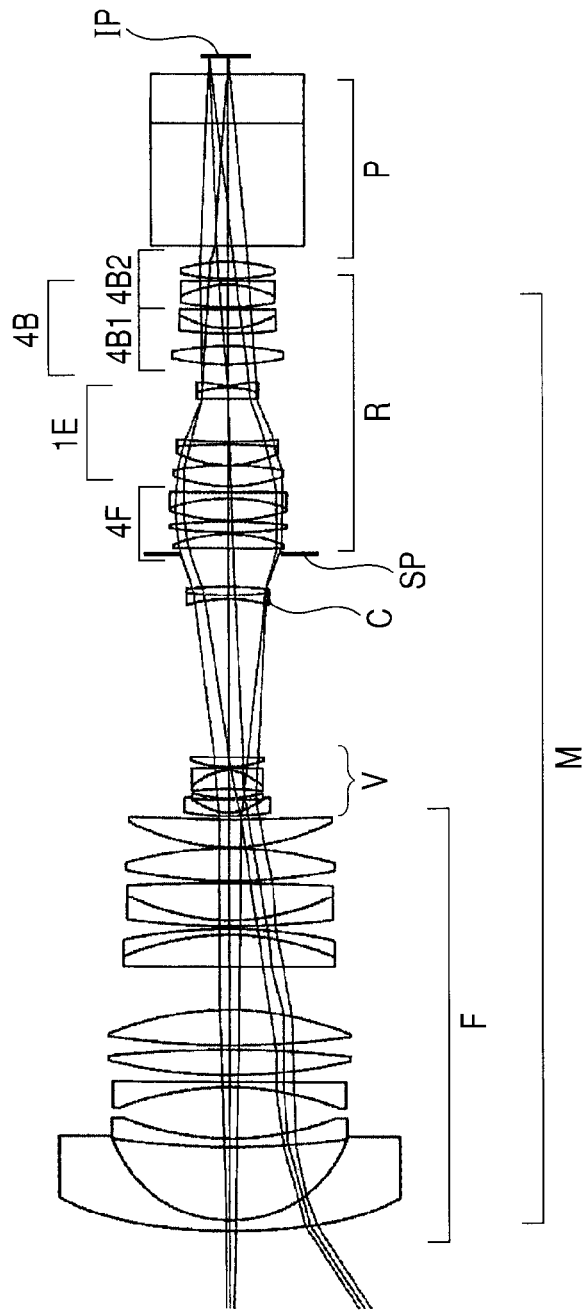
FIG. 4 is a lens cross-sectional view illustrating Embodiment 1 of the present invention at the wide angle end in a case where a lens unit (extender lens) is inserted.
Figure 5A:
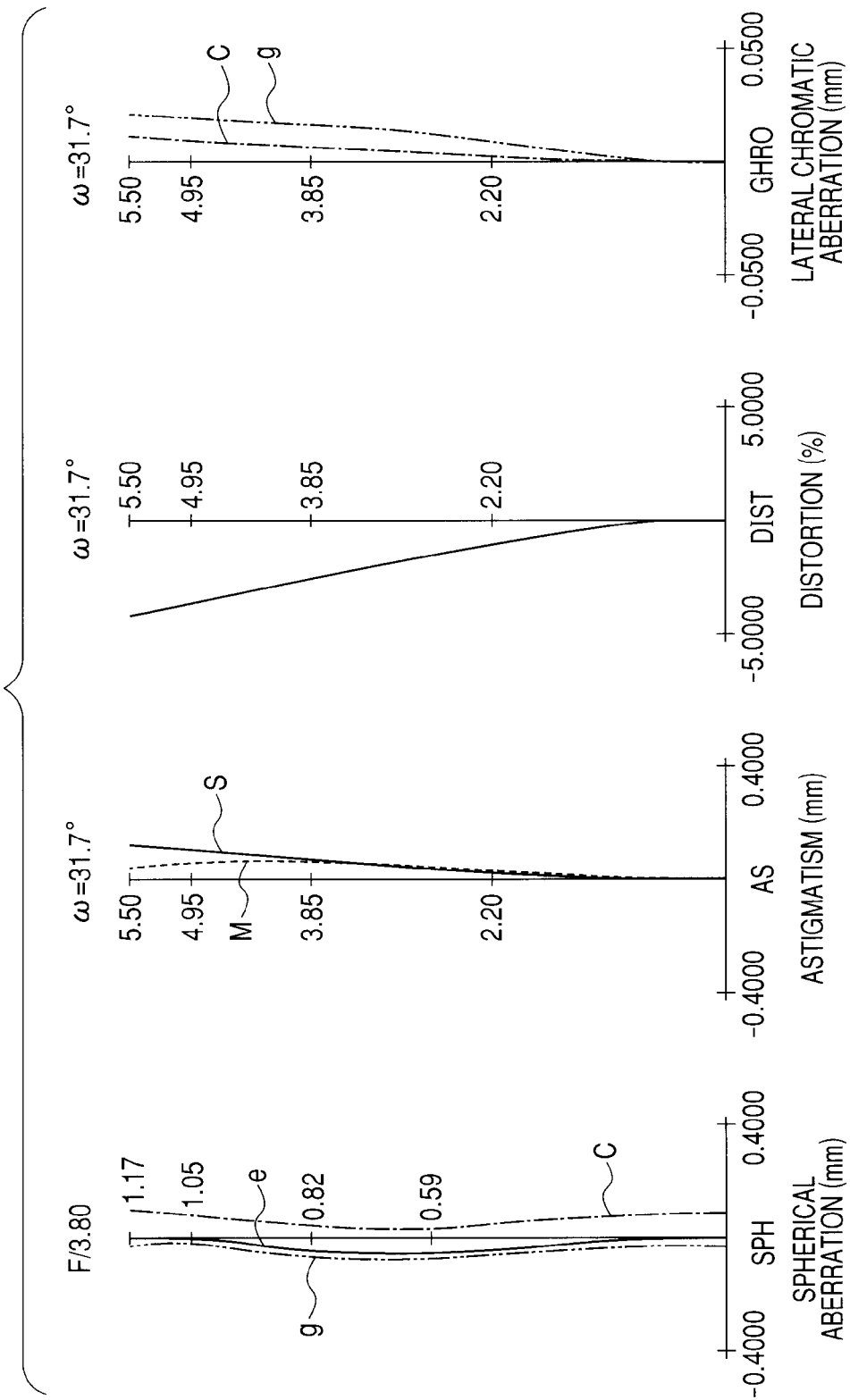
FIGS. 5A and 5B are aberration graphs in Embodiment 1 of the present invention in the case where the lens unit (extender lens) is inserted at the wide angle end and at the telephoto end, respectively.
Figure 5B:
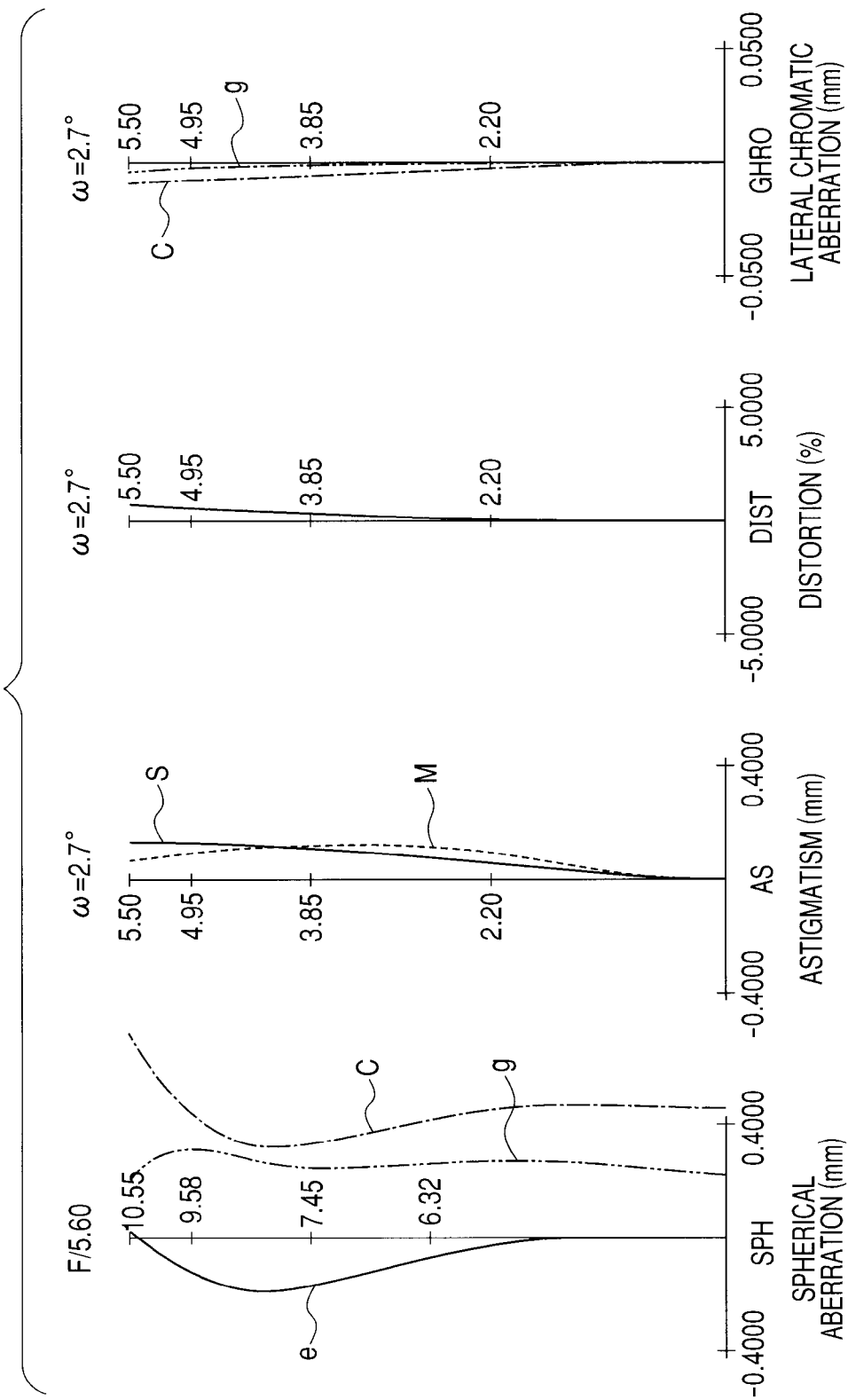
Figure 6:
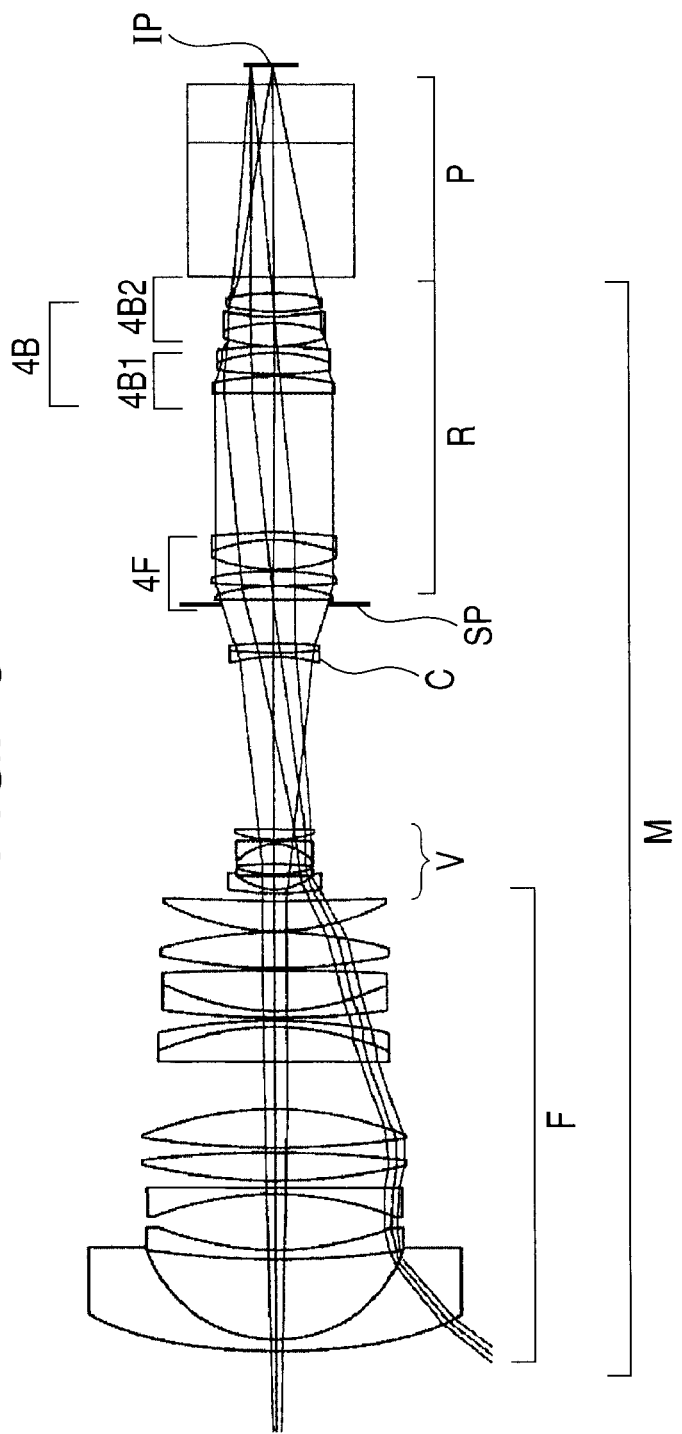
FIG. 6 is a lens cross-sectional view illustrating Embodiment 2 of the present invention at the wide angle end.
Figure 7A:
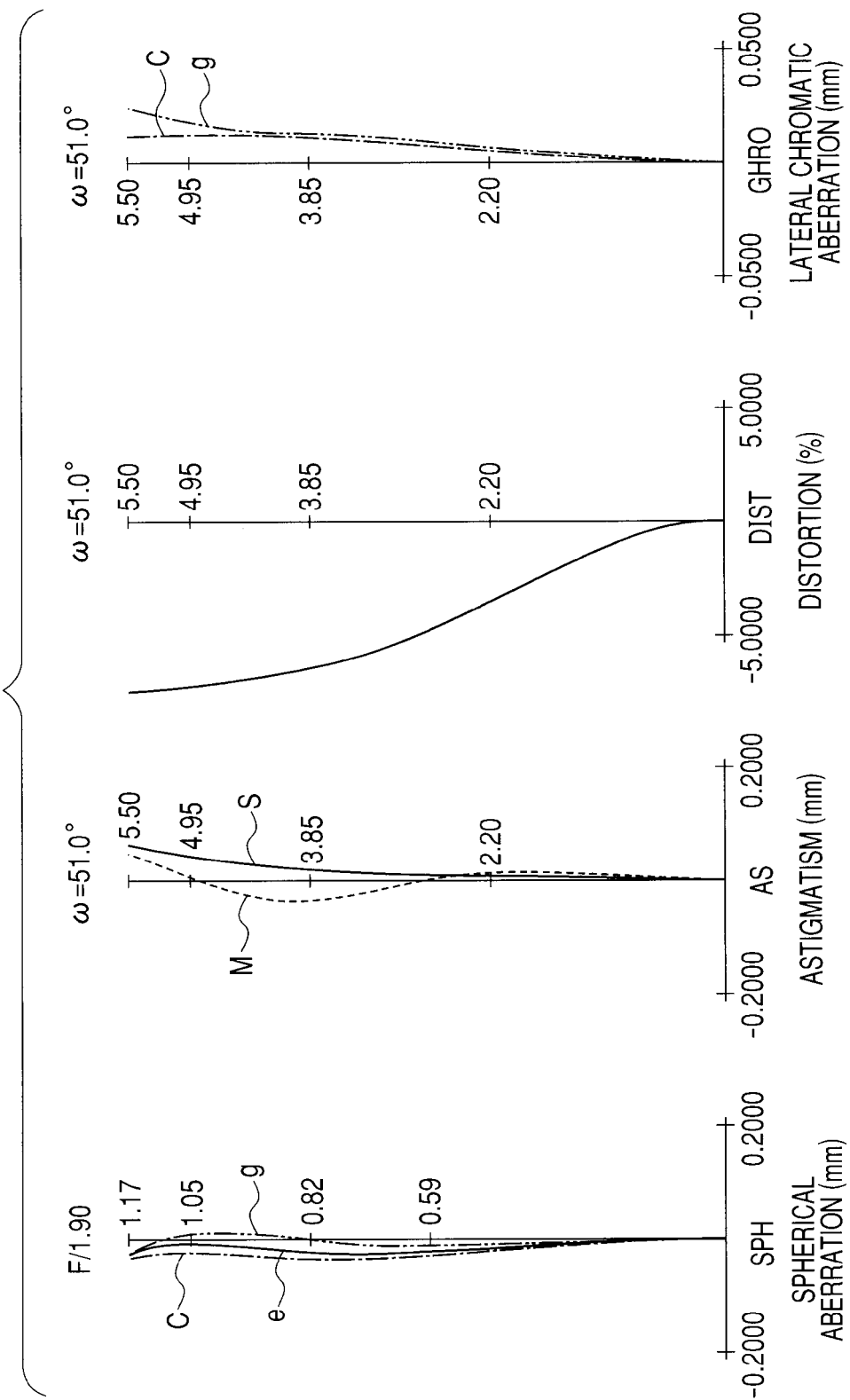
FIGS. 7A and 7B are aberration graphs in Embodiment 2 of the present invention at the wide angle end and at the telephoto end, respectively.
Figure 7B:
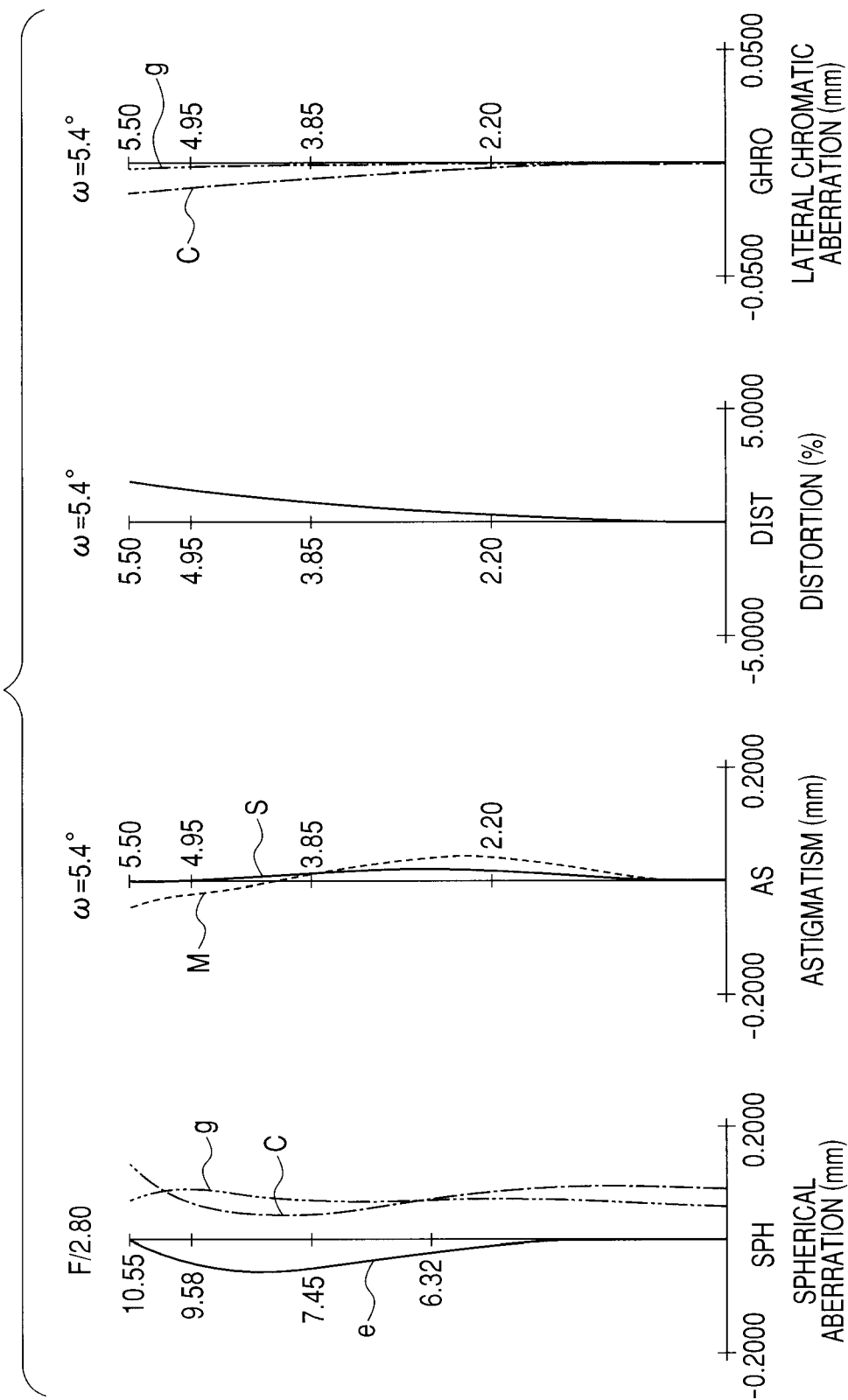
Figure 8:
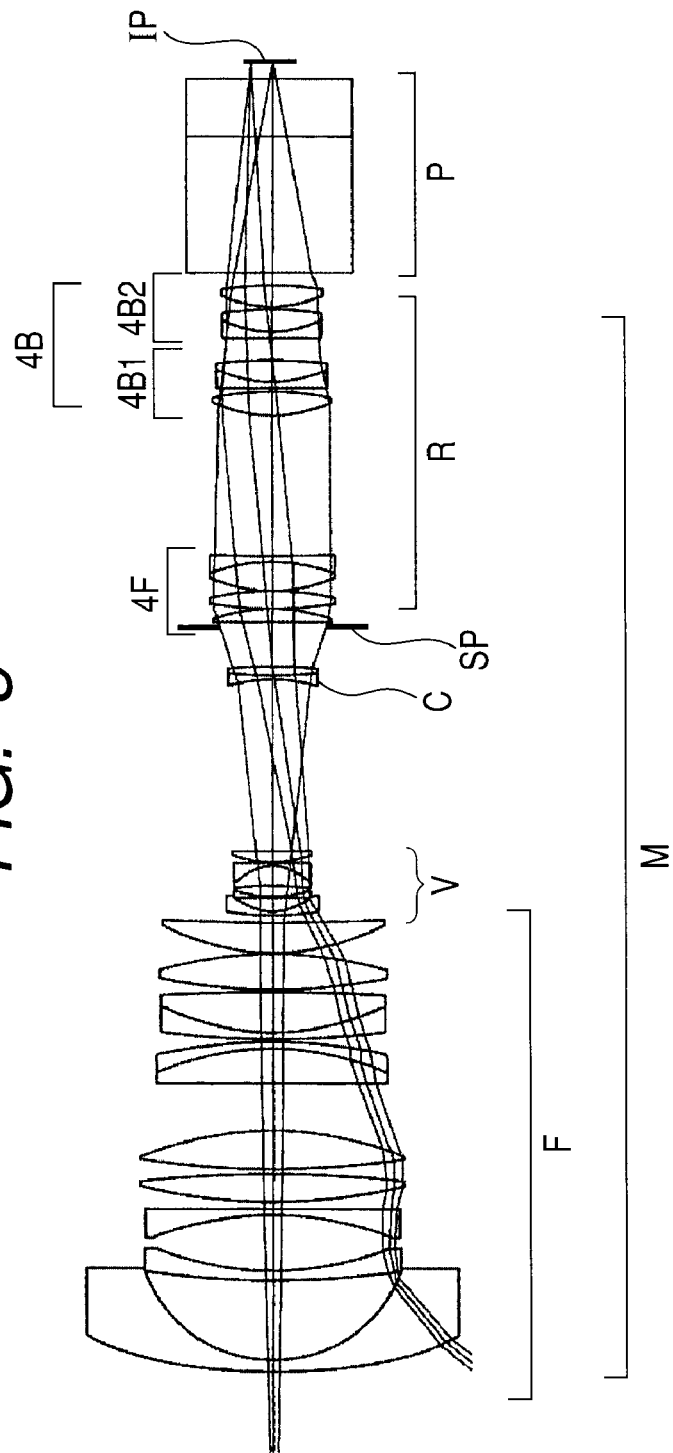
FIG. 8 is a lens cross-sectional view illustrating Embodiment 3 of the present invention at the wide angle end.
Figure 9A:
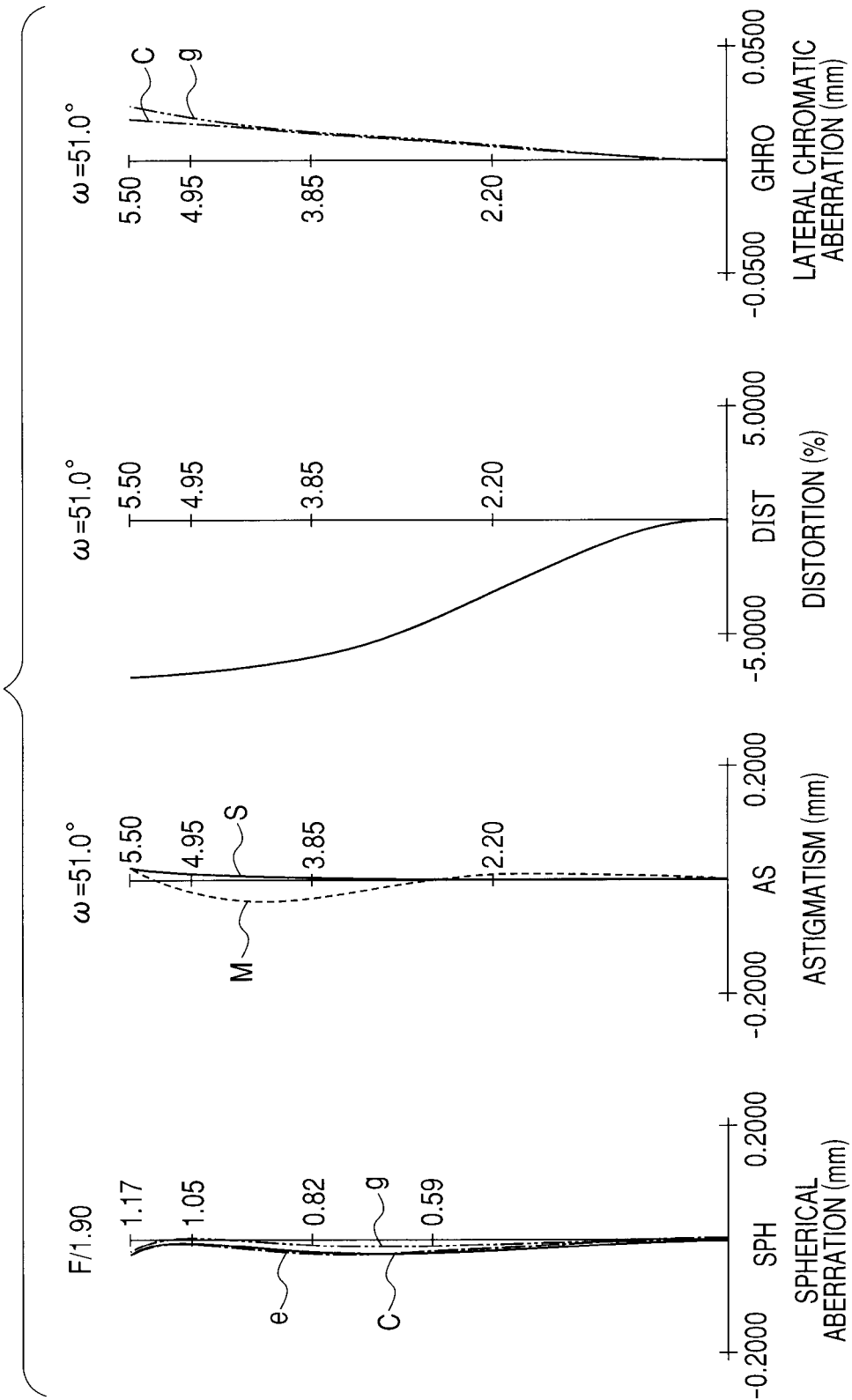
FIGS. 9A and 9B are aberration graphs in Embodiment 3 of the present invention at the wide angle end and at the telephoto end, respectively.
Figure 9B:
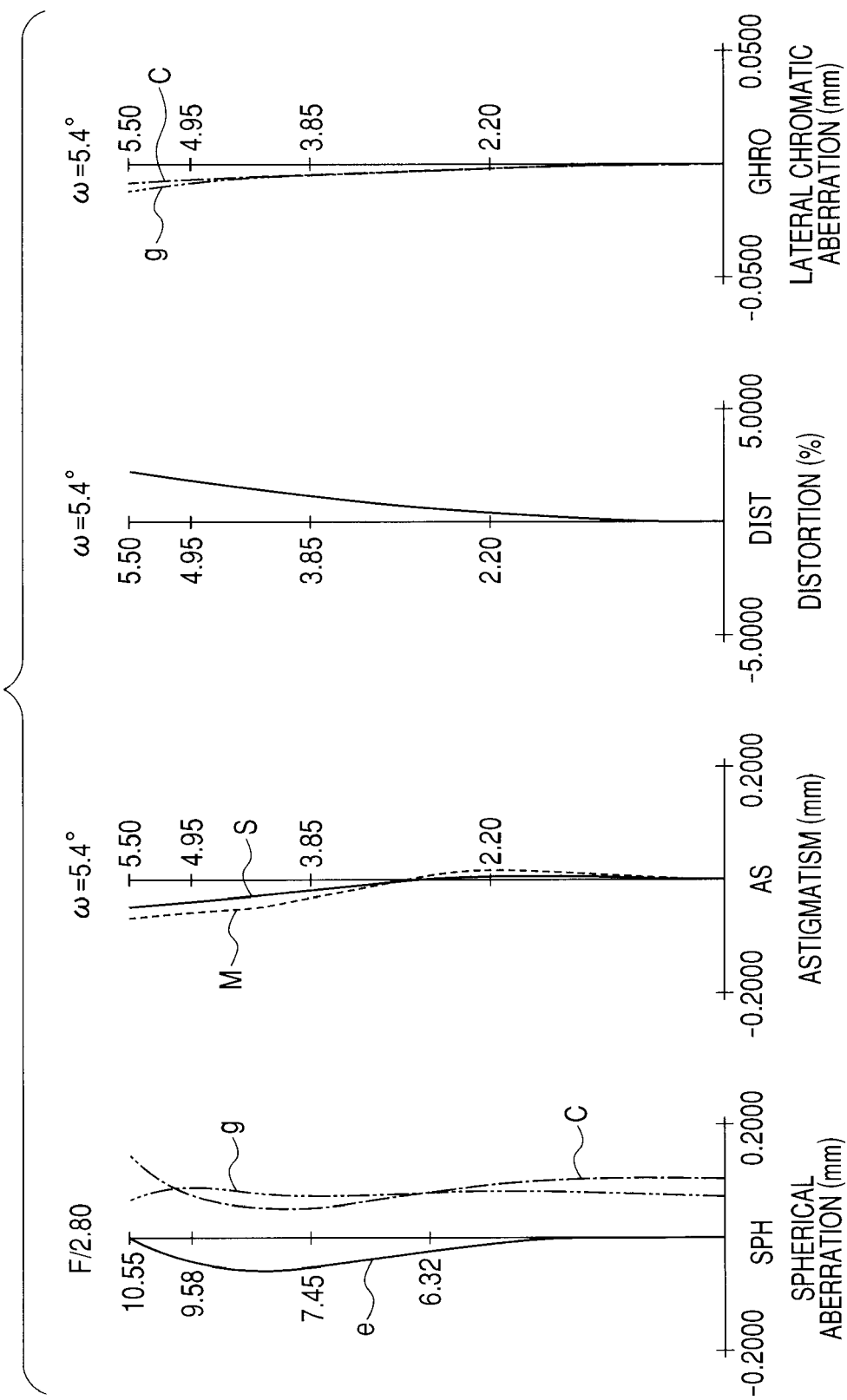
Figure 10:
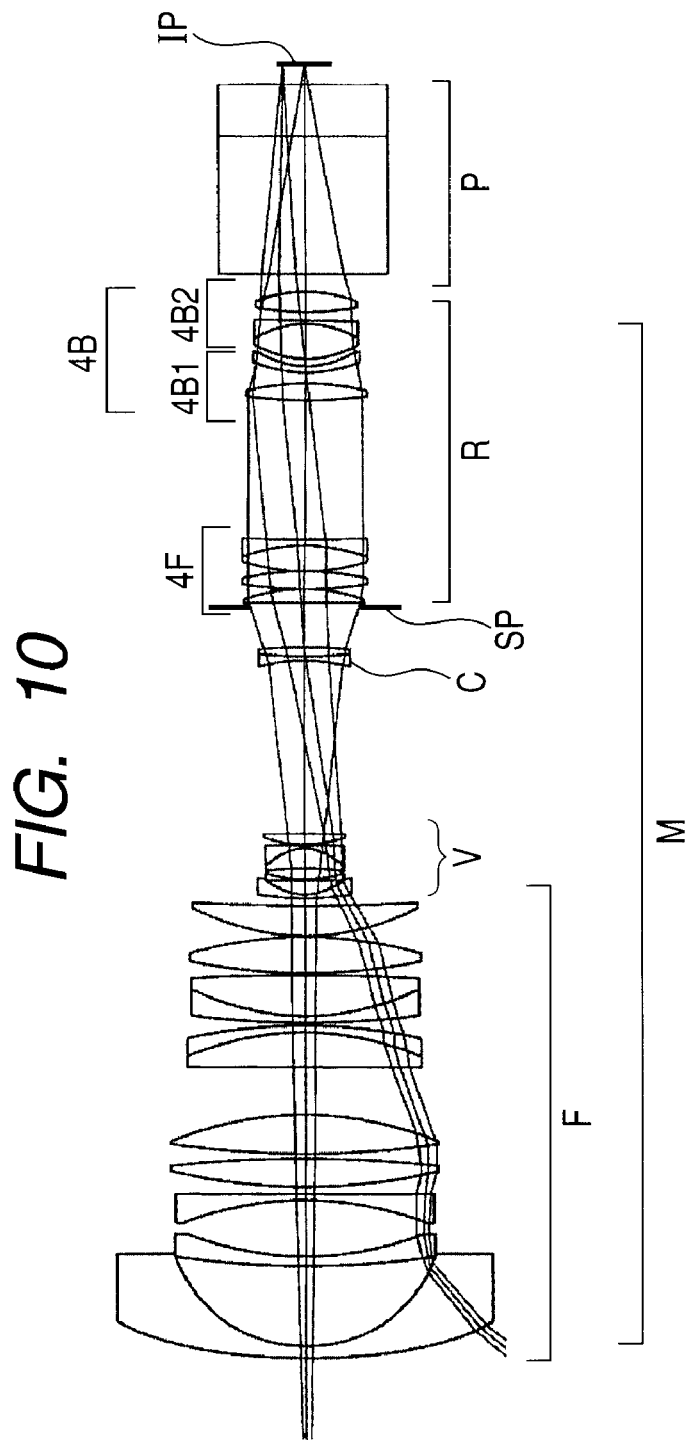
FIG. 10 is a lens cross-sectional view illustrating Embodiment 4 of the present invention at the wide angle end.
Figure 12:
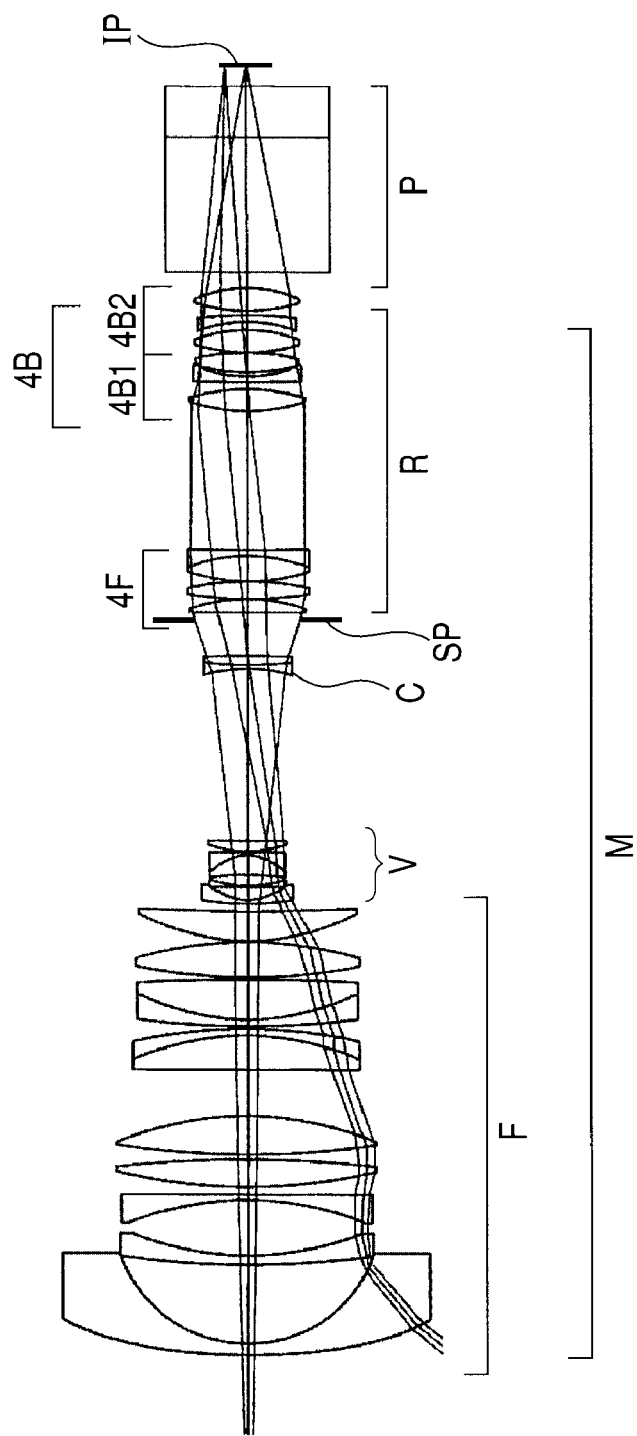
FIG. 12 is a lens cross-sectional view illustrating Embodiment 5 of the present invention at the wide angle end.
Figure 13B:
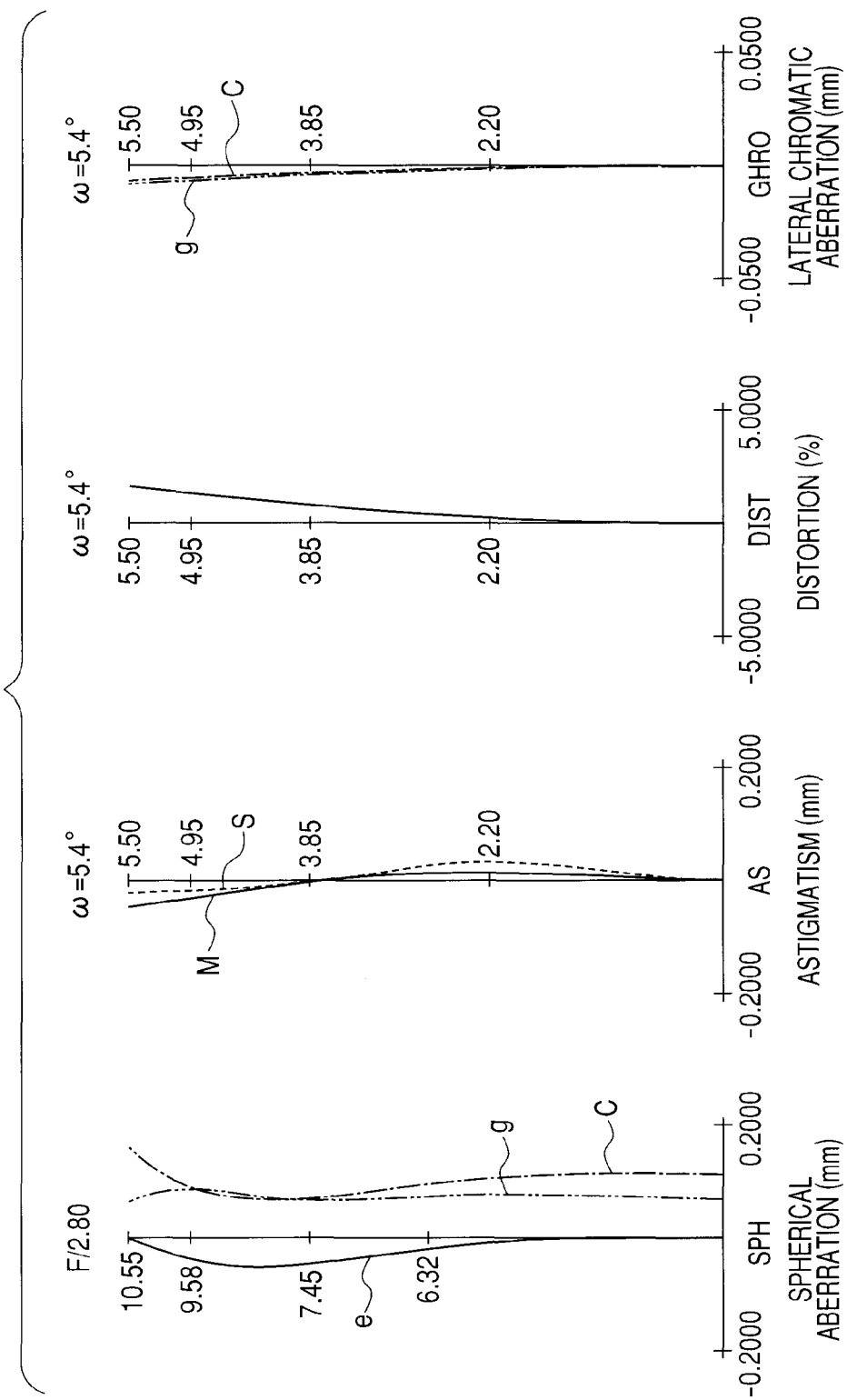
Figure 14:
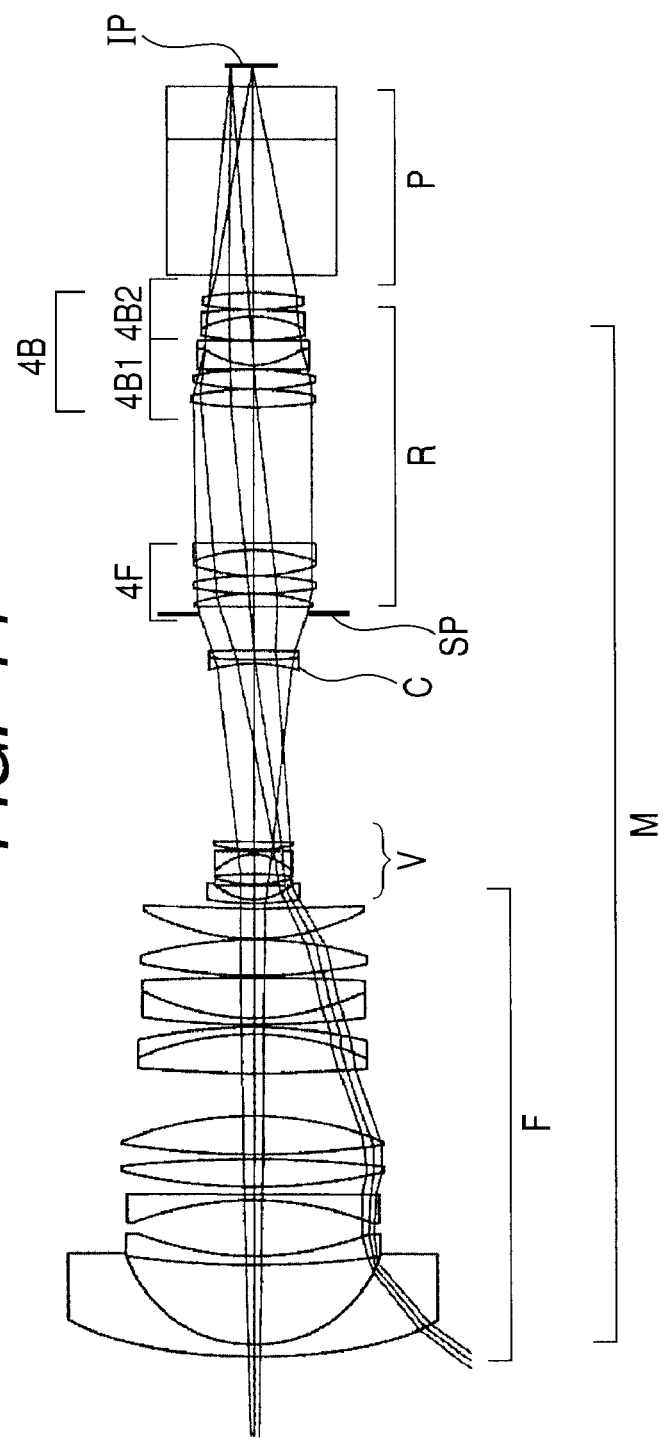
FIG. 14 is a lens cross-sectional view illustrating Embodiment 6 of the present invention at the wide angle end.
Figure 15A:
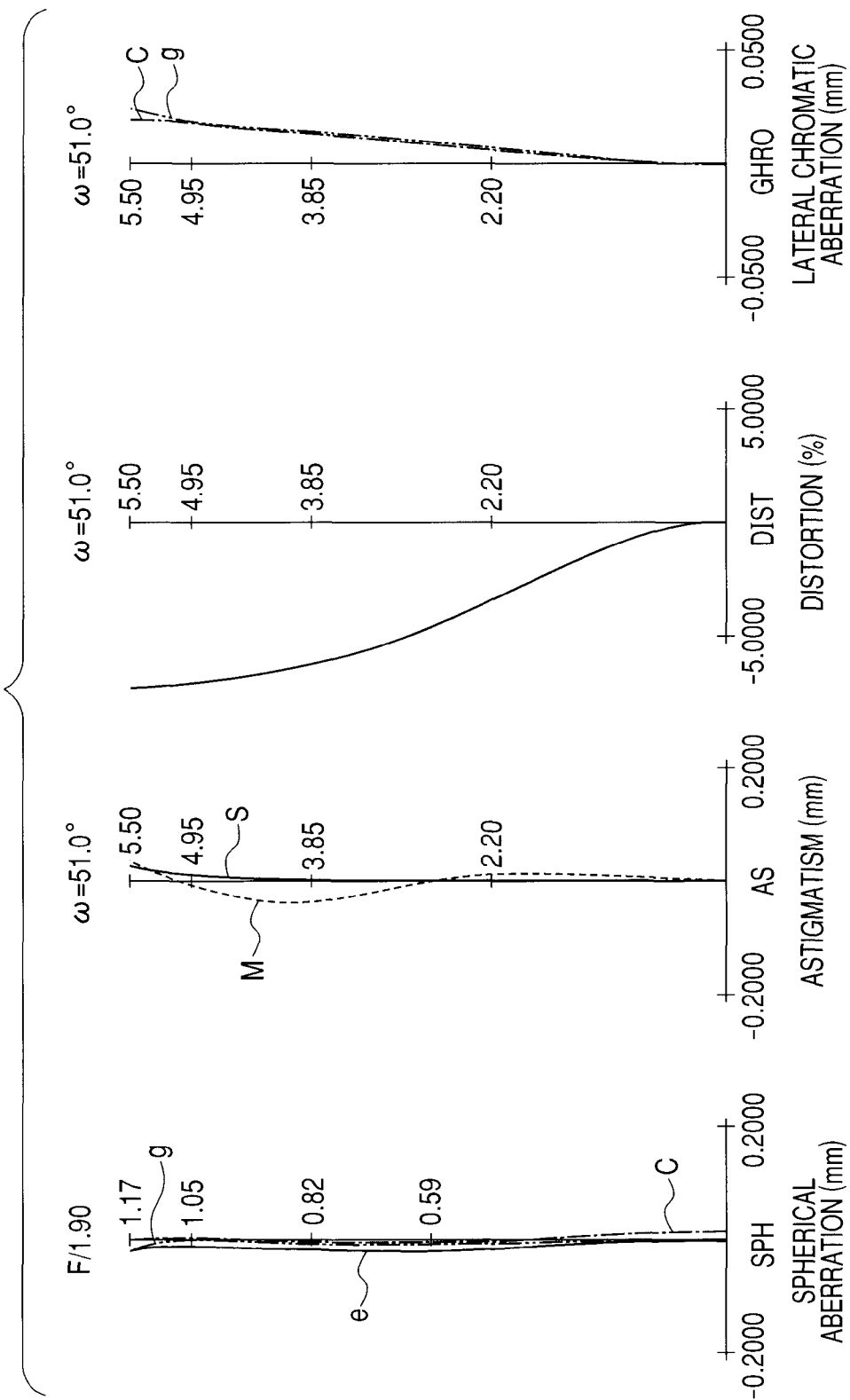
FIGS. 15A and 15B are aberration graphs in Embodiment 6 of the present invention at the wide angle end and at the telephoto end, respectively.
Figure 15B:
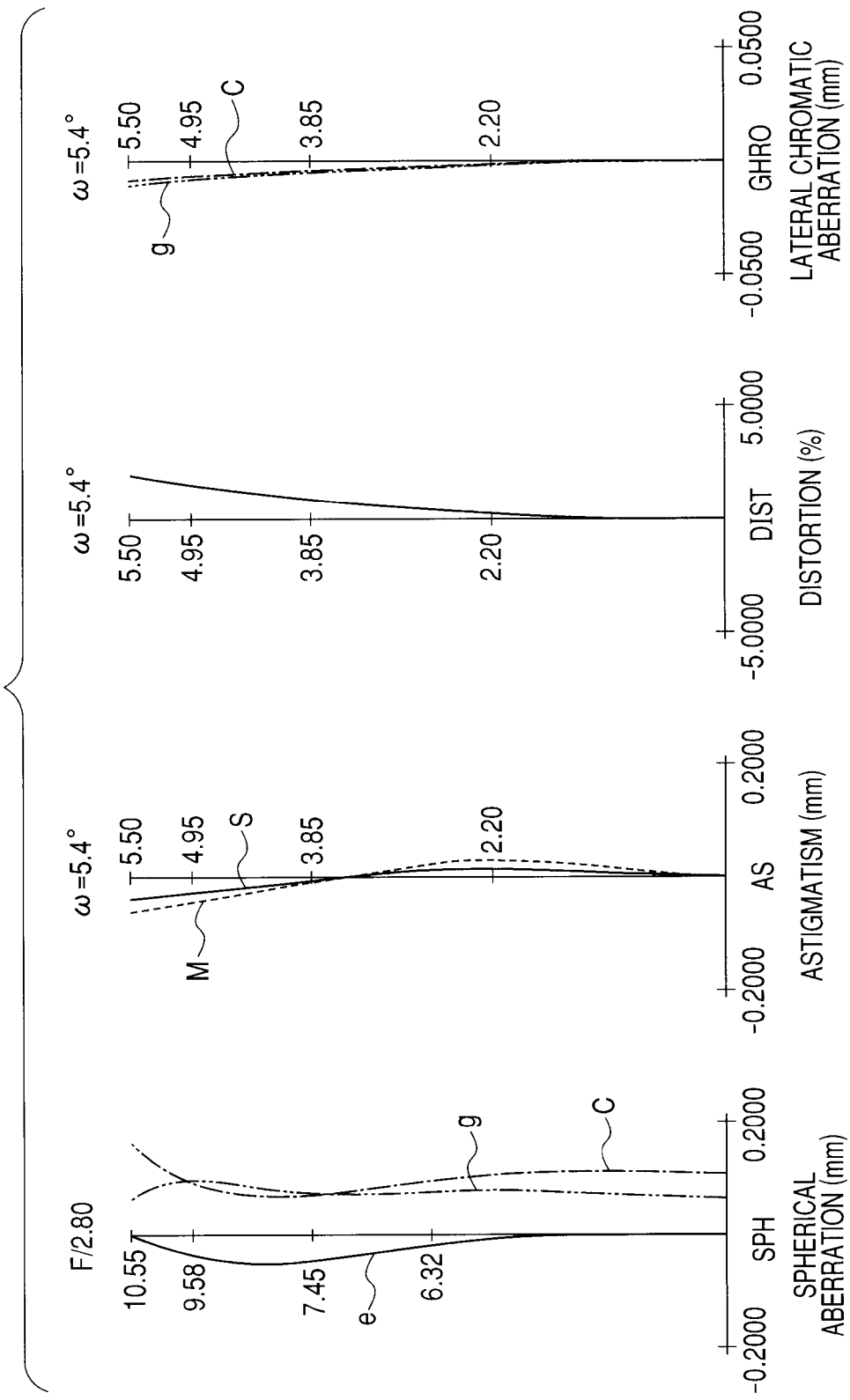
Figure 16:
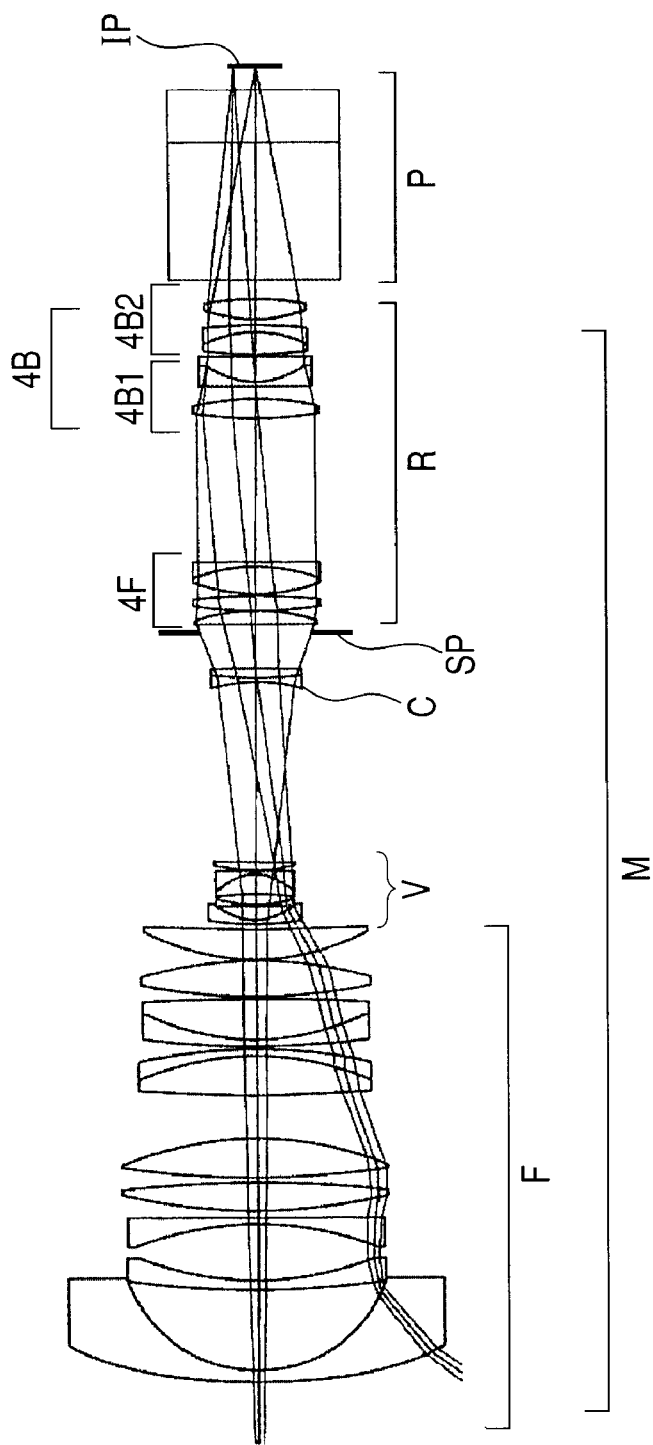
FIG. 16 is a lens cross-sectional view illustrating Embodiment 7 of the present invention at the wide angle end.

With respect to the numerical embodiments described above, FIG. 3A and FIG. 3B are aberration graphs at the wide angle end and the telephoto end, respectively, in Numerical Embodiment 1. FIG. 5A and FIG. 5B are aberration graphs at the wide angle end, respectively, and the telephoto end, respectively, in the case where the lens unit (extender lens) is inserted into the zoom lens system according to Embodiment 1. FIG. 7A and FIG. 7B are aberration graphs at the wide angle end and the telephoto end, respectively, in Embodiment 2. FIG. 9A and FIG. 9B are aberration graphs at the wide angle end and the telephoto end, respectively, in Embodiment 3. FIG. 11A and FIG. 11B are aberration graphs at the wide angle end and the telephoto end, respectively, in Embodiment 4. FIG. 13A and FIG. 13B are aberration graphs at the wide angle end and the telephoto end, respectively, in Embodiment 5. FIG. 15A and FIG. 15B are aberration graphs at the wide angle end and the telephoto end, respectively, in Embodiment 6. FIG. 17A and FIG. 17B are aberration graphs at the wide angle end and the telephoto end, respectively, in Embodiment 7.

According to each of the embodiments of the present invention, a zoom lens system having high optical performance over the entire zoom range and the image pickup apparatus including the zoom lens system are obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-020226, filed Jan. 30, 2009, which is hereby incorporated by reference herein in its entirety.

What is claimed is:

1. A zoom lens system comprising, in order from an object side to an image side:
   a first lens unit which does not move for zooming and has a positive refractive power;
   a second lens unit which moves toward the image side during zooming from a wide angle end to a telephoto end and has a negative refractive power;
   a third lens unit which moves during zooming; and
   a fourth lens unit which does not move for zooming,
   wherein the fourth lens unit includes, in order from the object side to the image side, a front subunit and a rear subunit,
   wherein the front subunit and the rear subunit are opposed to each other with an air interval sandwiched therebetween, the air interval being maximum among air intervals in the fourth lens unit,
   wherein the rear subunit includes two negative lenses and at least three positive lenses,
   wherein the rear subunit includes a first rear-subunit and a second rear-subunit,
   wherein a center position in a thickness direction of at least one lens included in the first rear-subunit is located in the object side of a center position of a total-length of the rear subunit in the optical axis direction, and a center position in a thickness direction of at least one lens included in the second rear-subunit is located in the image side of the center position of the total-length of the rear subunit in the optical axis direction,
   wherein each of the first rear-subunit and the second rear-subunit includes a negative lens and a positive lens,
   wherein the following conditions are satisfied:

$0.50 < \nu 1p/\nu 1n < 1.10$; and $2.30 < \nu 2p/\nu 2n$, where $\nu 1p$ and $\nu 2p$ indicate an average Abbe number of materials of the positive lens of the first rear-subunit and an average Abbe number of materials of the positive lens of the second rear-subunit, respectively, and $\nu 1n$ and $\nu 2n$ indicate an Abbe number of a material of the negative lens of the first rear-subunit and an Abbe number of a material of the negative lens of the second rear-subunit, respectively,
   wherein an angle of field of the zoom lens system at the wide angle end is equal to or greater than 78 degrees, and
   wherein the first lens unit includes in order from the most-object side:
   a first meniscus lens having a negative refractive power with a convex surface facing the object side;
   a second meniscus lens having a negative refractive power with a convex surface facing the object side;
   a third negative lens;
   a fourth positive lens; and
   a fifth positive lens.

2. A zoom lens system according to claim 1, wherein the following conditions are satisfied:

$\theta 2n + 0.00162 \times \nu 2n < 0.670$; and $(\theta 2n - \theta 2p)/(\nu 2p - \nu 2n) < 0.0023$, where $\nu 2p$ and $\theta 2p$ indicate the average Abbe number and an average partial dispersion ratio of the materials of the positive lens of the second rear-subunit, respectively, and $\nu 2n$ and $\theta 2n$ indicate the Abbe number and a partial dispersion ratio of the material of the negative lens of the second rear-subunit, respectively.

3. A zoom lens system according to claim 1, wherein the fourth lens unit further comprises a lens unit which is removably inserted onto an optical path between the front subunit and the rear subunit, for changing a focal length range of an entire system of the zoom lens system.

4. A zoom lens system according to claim 1, wherein the following conditions are satisfied:

$-1.1 < f1p/f1n < -0.3$; and $-1.3 < f2p/f2n < -0.5$, where f1p, f2p, f1n, and f2n indicate a composite focal length of the positive lens of the first rear-subunit, a composite focal length of the positive lens of the second rear-subunit, a focal length of the negative lens of the first rear-subunit, and a focal length of the negative lens of the second rear-subunit, respectively.

5. A zoom lens system according to claim 1, wherein the zoom lens system forms an image on a photoelectric transducer.

6. A zoom lens system according to claim 5, wherein the following condition is satisfied:

$0.32 < fw/IS < 0.47$, where IS indicates a diagonal length of an effective region of the photoelectric transducer and fw indicates a focal length of an entire system of the zoom lens system at the wide angle end.

7. A zoom lens system according to claim 1, wherein the first lens unit includes:
   a sixth positive lens adjacent to the fifth positive lens;
   a seventh meniscus lens having negative refractive power which is cemented to the sixth positive lens and has a convex surface facing an image side;
   an eighth meniscus lens having negative refractive power which is disposed adjacent to the seventh lens and has a convex surface facing the object side; and
   a ninth positive lens which is cemented to the eighth lens.

8. A zoom lens system according to claim 1, wherein each of the first rear-subunit and the second rear-subunit includes a cemented lens constituted by a positive lens and a negative lens.

9. A zoom lens system according to claim 1, wherein the first rear-subunit includes in order from the object side: a biconvex positive lens; and a cemented lens composed of a negative lens and a positive lens.

10. A zoom lens system according to claim 1, wherein the second rear-subunit includes in order from the object side: a cemented lens composed of a biconvex positive lens and a negative lens; and a biconvex positive lens.

11. A zoom lens system according to claim 1, further comprising a stop disposed between the third lens unit and the fourth lens unit.

12. An image pickup apparatus comprising:
   a photoelectric transducer; and
   a zoom lens system for forming a subject image on the photoelectric transducer, wherein the zoom lens system includes, in order from an object side to an image side:
   a first lens unit which does not move for zooming and has a positive refractive power;

a second lens unit which moves toward the image side during zooming from a wide angle end to a telephoto end and has a negative refractive power;
a third lens unit which moves during zooming; and
a fourth lens unit which does not move for zooming,
wherein the fourth lens unit includes a front subunit and a rear subunit which are provided in order from the object side to the image side,
wherein the front subunit and the rear subunit are opposed to each other with an air interval therebetween, the air interval being maximum among air intervals in the fourth lens unit,
wherein the rear subunit includes two negative lenses and at least three positive lenses,
wherein the rear subunit includes a first rear-subunit and a second rear-subunit,
wherein a center position in a thickness direction of at least one lens included in the first rear-subunit is located in the object side of a center position of a total-length of the rear subunit in an optical axis direction, and a center position in a thickness direction of at least one lens included in the second rear-subunit is located in the image side of the center position of the total-length of the rear subunit in the optical axis direction,
wherein each of the first rear-subunit and the second rear-subunit includes a negative lens and a positive lens,
wherein the following conditions are satisfied:

$$0.50 < v1p/v1n < 1.10;\text{ and}$$

$$2.30 < v2p/v2n,$$

where v1p and v2p indicate an average Abbe number of materials of the positive lens of the first rear-subunit and an average Abbe number of materials of the positive lens of the second rear-subunit, respectively, and v1n and v2n indicate an Abbe number of a material of the negative lens of the first rear-subunit and an Abbe number of a material of the negative lens of the second rear-subunit, respectively,
wherein an angle of field of the zoom lens system at the wide angle end is equal to or greater than 78 degrees, and
wherein the first lens unit includes in order from the most-object side:
a first meniscus lens having a negative refractive power with a convex surface facing the object side;
a second meniscus lens having a negative refractive power with a convex surface facing the object side;
a third negative lens;
a fourth positive lens; and
a fifth positive lens.

* * * * *